(12) United States Patent
Rahman et al.

(10) Patent No.: US 11,316,573 B2
(45) Date of Patent: Apr. 26, 2022

(54) HIGH-RESOLUTION CSI REPORTING BASED ON UNEQUAL BIT ALLOCATION IN ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 16/947,623

(22) Filed: Aug. 10, 2020

(65) Prior Publication Data

US 2020/0373986 A1 Nov. 26, 2020

Related U.S. Application Data

(63) Continuation of application No. 15/947,539, filed on Apr. 6, 2018, now Pat. No. 10,742,290.

(60) Provisional application No. 62/545,218, filed on Aug. 14, 2017, provisional application No. 62/488,383, filed on Apr. 21, 2017, provisional application No. 62/487,818, filed on Apr. 20, 2017, provisional application No. 62/487,263, filed on Apr. 19, 2017,
(Continued)

(51) Int. Cl.
*H04B 7/06* (2006.01)
*H04W 72/04* (2009.01)
*H04B 7/0456* (2017.01)
*H04W 4/70* (2018.01)

(52) U.S. Cl.
CPC ........ *H04B 7/0626* (2013.01); *H04B 7/0456* (2013.01); *H04B 7/0639* (2013.01); *H04W 72/0406* (2013.01); *H04W 4/70* (2018.02)

(58) Field of Classification Search
CPC .. H04B 7/0626; H04B 7/0639; H04B 7/0456; H04W 72/0406; H04W 4/70
See application file for complete search history.

(56) References Cited

U.S. PATENT DOCUMENTS 10,200,103 B2    2/2019  Rahman et al.
2016/0329945 A1* 11/2016 Onggosanusi ....... H04B 7/0626
(Continued)

FOREIGN PATENT DOCUMENTS

WO    2018097600 A1    5/2018

OTHER PUBLICATIONS

Communication pursuant to Article 94(3) EPC in connection with European Application No. 18784968.2 dated Sep. 17, 2020, 6 pages.
(Continued)

*Primary Examiner* — Ajay Cattungal

(57) ABSTRACT

Methods and apparatuses for reporting a precoding matrix indicator (PMI). A user equipment (UE) includes a processor configured to generate a report for a PMI. The report includes (i) a wideband amplitude coefficient indicator that is common for a plurality of subbands configured for reporting and (ii) a subband amplitude coefficient indicator and a subband phase coefficient indicator for each of the subbands. The UE further includes a transceiver operably connected to the processor. The transceiver configured to transmit the generated report for the PMI to a base station.

20 Claims, 10 Drawing Sheets

Related U.S. Application Data provisional application No. 62/485,155, filed on Apr. 13, 2017.

(56) References Cited

U.S. PATENT DOCUMENTS

| | | | |
|---|---|---|---|
| 2017/0237535 A1* | 8/2017 | Park | H04W 72/0426 |
| | | | 370/329 |
| 2018/0034612 A1* | 2/2018 | Lin | H04B 17/345 |
| 2018/0145737 A1* | 5/2018 | Rahman | H04B 7/0634 |
| 2018/0175993 A1* | 6/2018 | Onggosanusi | H04B 7/0486 |
| 2019/0059013 A1* | 2/2019 | Rahman | H04L 1/00 |
| 2019/0199420 A1* | 6/2019 | Faxer | H04B 7/0632 |

OTHER PUBLICATIONS

Nokia et al., "Reduced PMI Payload in the NR Type II Codebooks," R1-1716505, 3GPP TSG RAN WG1 Meeting NR#3, Nagoya, Japan, Sep. 18-21, 2017, 5 pages.

Samsung, "Type II CSI reporting," R1-1702948, 3GPP TSG RAN WG1 Meeting #88, Athens, Greece, Feb. 13-17, 2017, 7 pages.

Samsung, "Remaining details of Type II CSI codebook," R1-1715956, 3GPP TSG RAN WG1 NR Ad-Hoc#3, Nagoya, Japan, Sep. 18-21, 2017, 7 pages.

\* cited by examiner

HIGH-RESOLUTION CSI REPORTING BASED ON UNEQUAL BIT ALLOCATION IN ADVANCED WIRELESS COMMUNICATION SYSTEMS

CROSS-REFERENCE TO RELATED APPLICATIONS AND CLAIM OF PRIORITY

This application is a continuation of U.S. Non-Provisional patent application Ser. No. 15/947,539 filed Apr. 6, 2018, and claims priority to: U.S. Provisional Patent Application No. 62/485,155 filed on Apr. 13, 2017; U.S. Provisional Patent Application No. 62/487,263 filed on Apr. 19, 2017; U.S. Provisional Patent Application No. 62/487,818 filed on Apr. 20, 2017; U.S. Provisional Patent Application No. 62/488,383 filed on Apr. 21, 2017; and U.S. Provisional Patent Application Ser. No. 62/545,218 filed on Aug. 14, 2017. The content of the above-identified patent documents is incorporated herein by reference.

TECHNICAL FIELD

The present disclosure relates generally to CSI reporting schemes based on an unequal bit allocation in advanced wireless communication systems.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

Embodiments of the present disclosure provide methods and apparatuses for CSI reporting schemes based on an unequal bit allocation in an advanced wireless communication system.

In one embodiment, a UE is provided. The UE includes a processor configured to generate a report for a precoding matrix indicator (PMI). The report includes (i) a wideband amplitude coefficient indicator that is common for a plurality of subbands configured for reporting and (ii) a subband amplitude coefficient indicator and a subband phase coefficient indicator for each of the subbands. The UE further includes a transceiver operably connected to the processor. The transceiver is configured to transmit the generated report for the PMI to a base station.

In another embodiment, a base station (BS) is provided. The BS includes a transceiver configured to receive a report for a PMI. The report includes (i) a wideband amplitude coefficient indicator that is common for a plurality of subbands configured for reporting and (ii) a subband amplitude coefficient indicator and a subband phase coefficient indicator for each of the subbands. The BS also includes a processor operably connected to the transceiver.

In yet another embodiment, a method for reporting a PMI by a UE is provided. The method includes generating a report for a PMI. The report includes (i) a wideband amplitude coefficient indicator that is common for a plurality of subbands configured for reporting and (ii) a subband amplitude coefficient indicator and a subband phase coefficient indicator for each of the subbands. The method further includes transmitting the generated report for the PMI to a base station.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
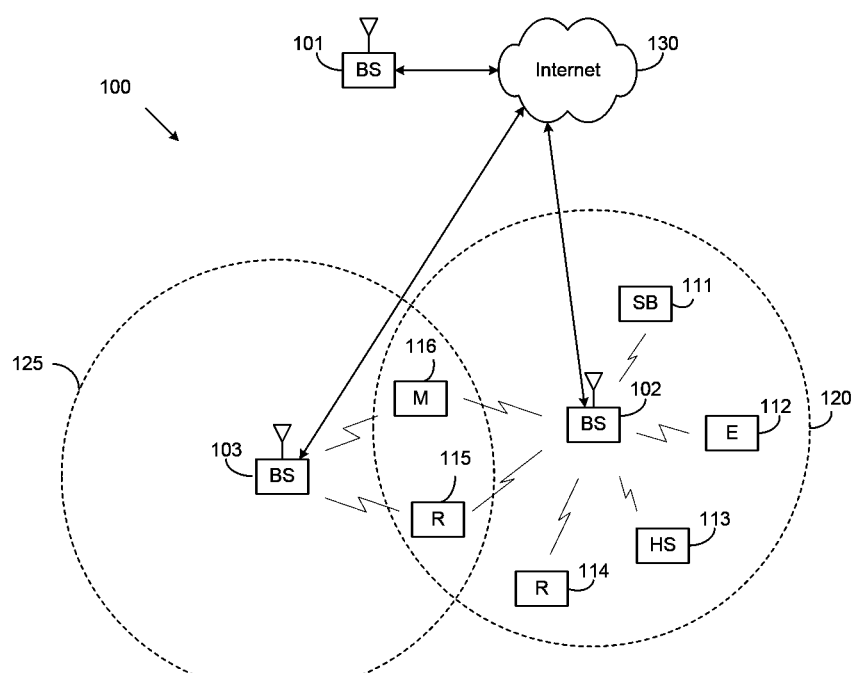
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.2.0, "E-UTRA, Physical channels and modulation;" 3GPP TS 36.212 v14.2.0, "E-UTRA, Multiplexing and Channel coding;" 3GPP TS 36.213 v14.2.0, "E-UTRA, Physical Layer Procedures;" 3GPP TS 36.321 v14.2.0, "E-UTRA, Medium Access Control (MAC) protocol specification;" 3GPP TS 36.331 v14.2.0, "E-UTRA, Radio Resource Control (RRC) protocol specification" and 3GPP TR 22.891 v1.2.0, "Feasibility Study on New Services and Markets Technology Enablers."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
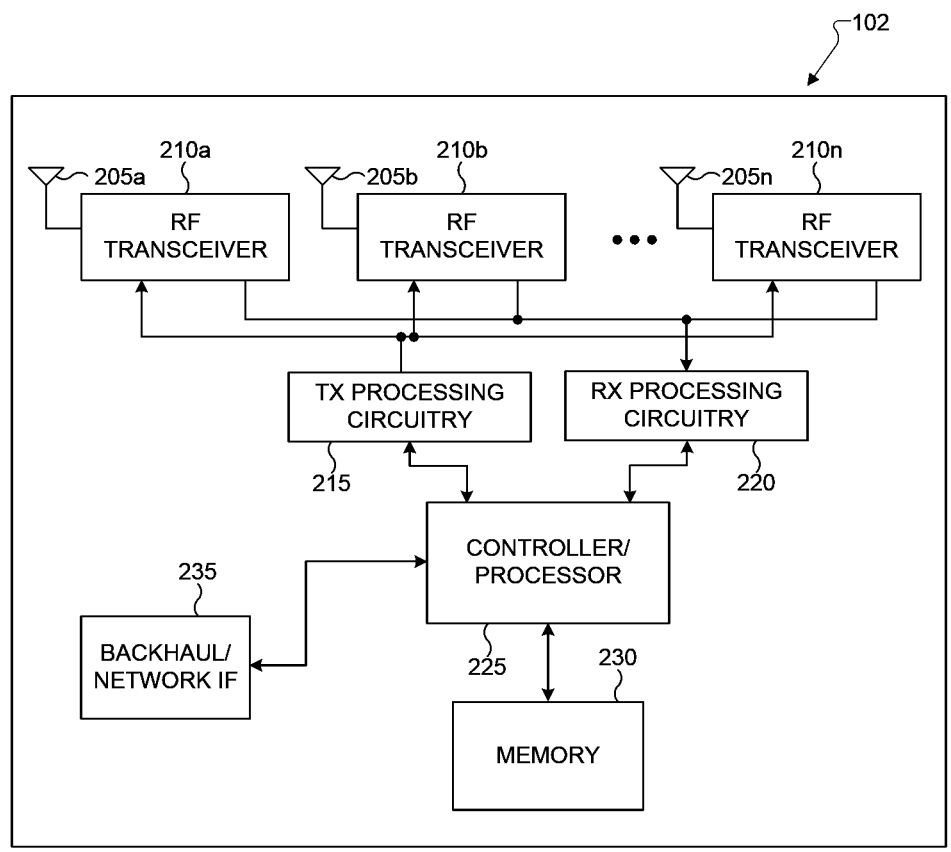
FIG. 2 illustrates an example eNB according to embodiments of the present disclosure.
Figure 3:
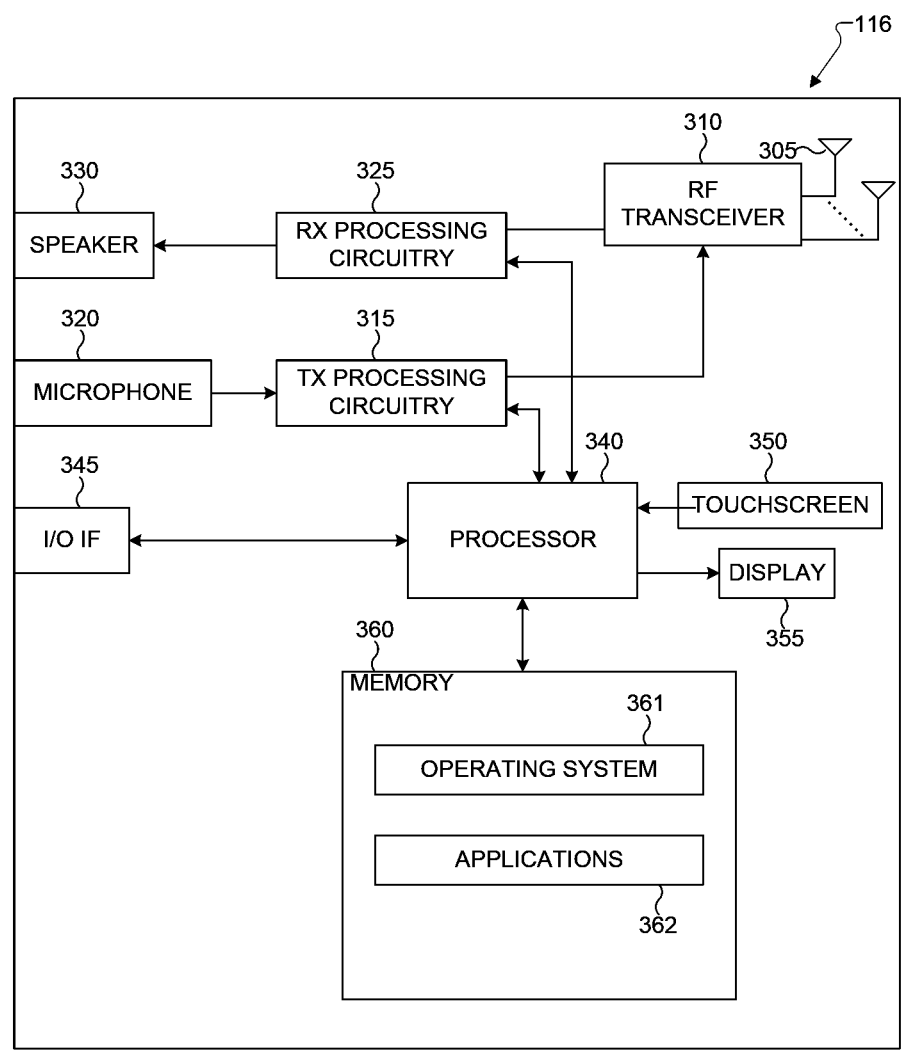
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting in an advanced wireless communication system. In certain embodiments, and one or more of the eNBs 101-103 includes circuitry, programing, or a combination thereof, for receiving efficient CSI reporting for a PMI based on unequal bit allocation in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting for a PMI based on unequal bit allocation. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
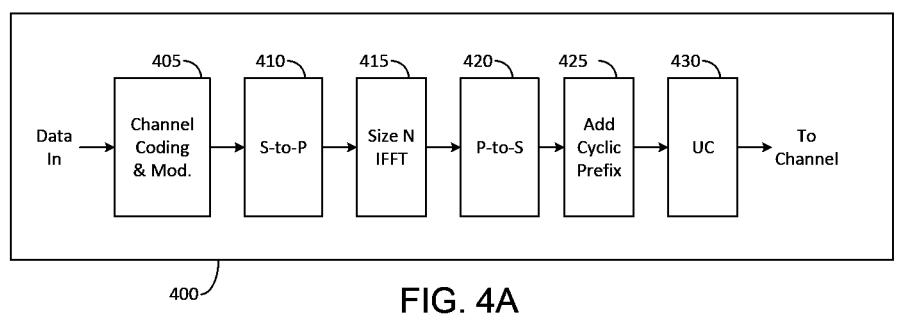
FIG. 4A illustrates a high-level diagram of an orthogonal frequency division multiple access transmit path according to embodiments of the present disclosure.
Figure 4B:
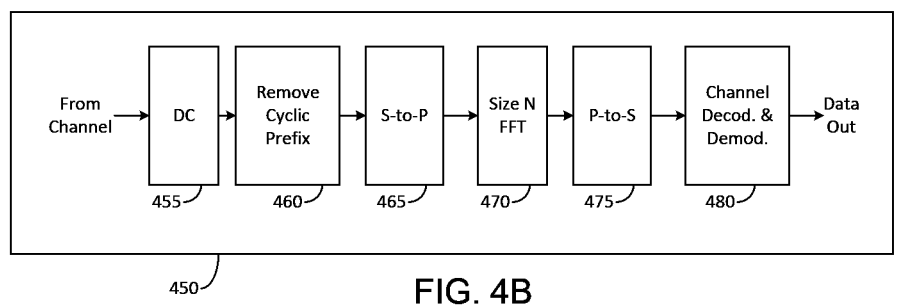
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as BSs or NodeBs to UEs and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
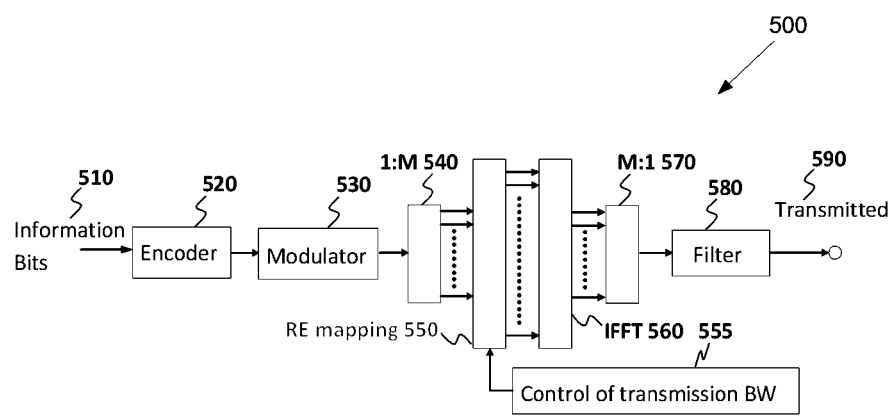
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
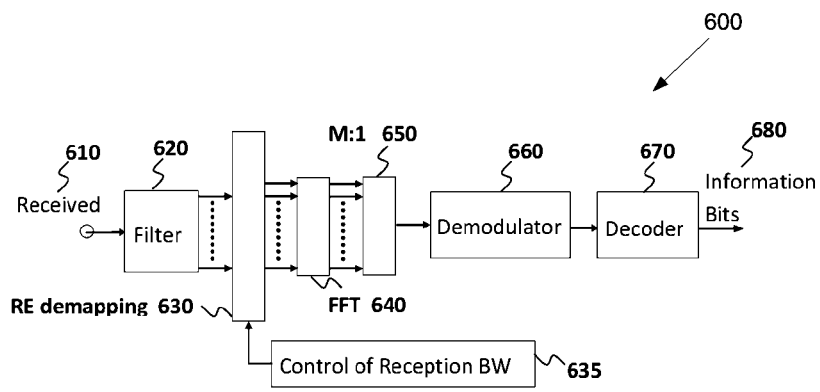
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
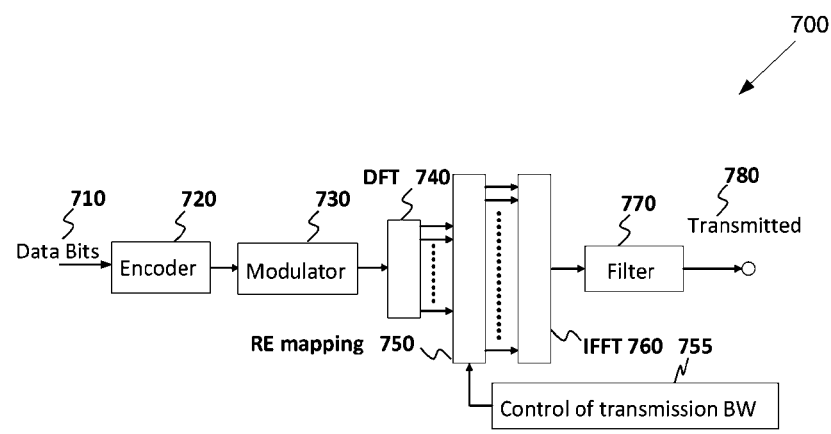
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
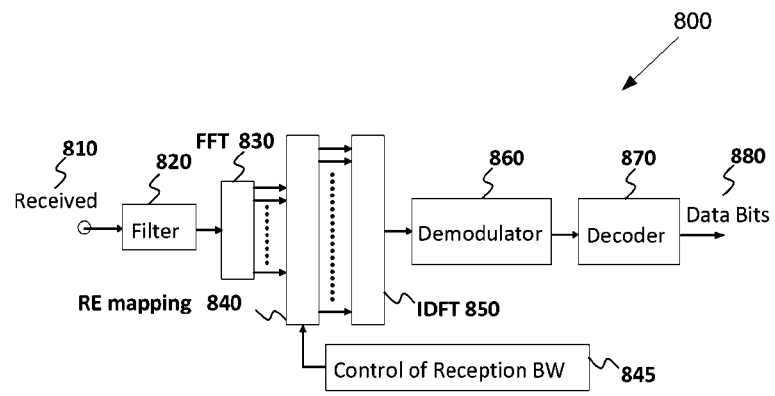
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
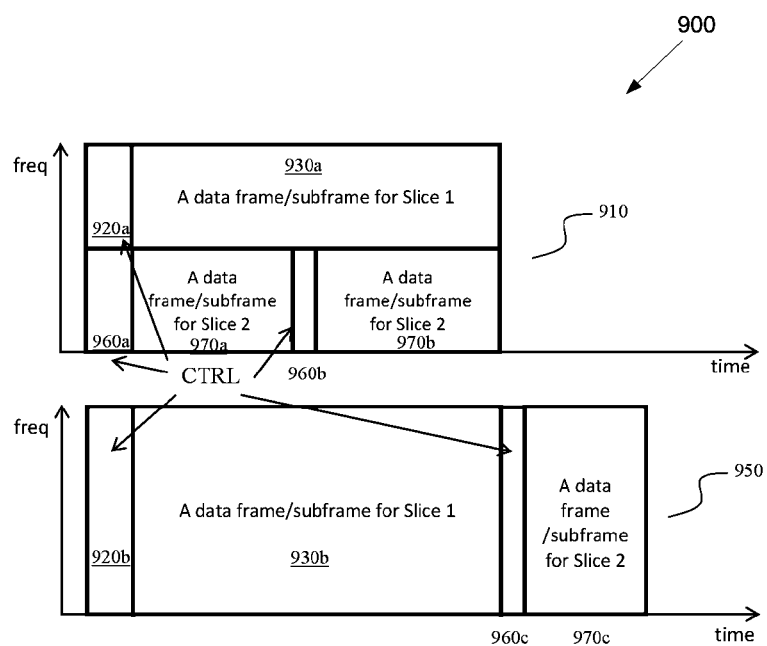
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
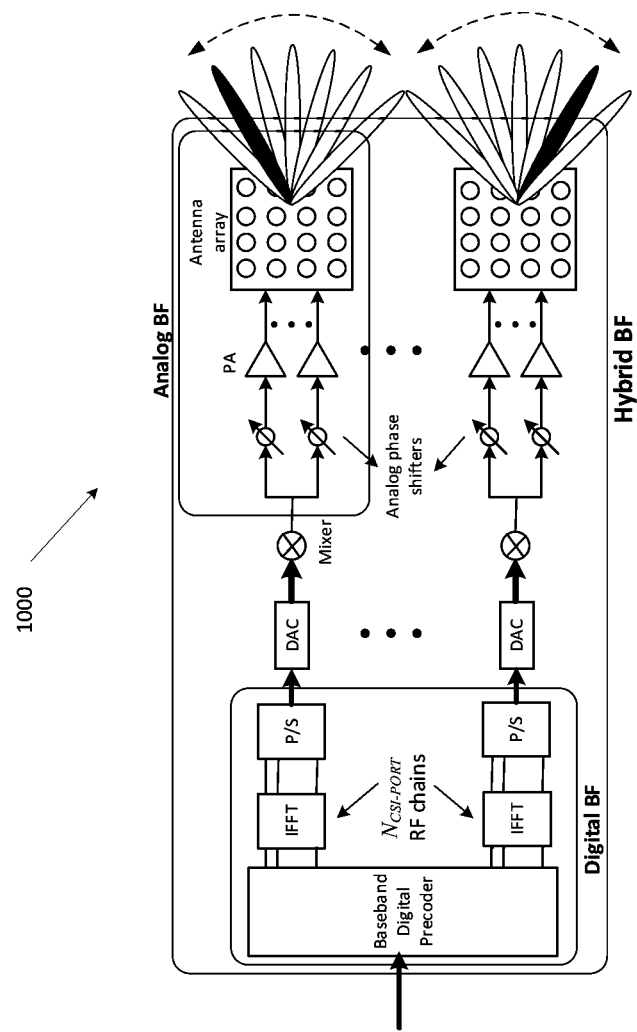
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
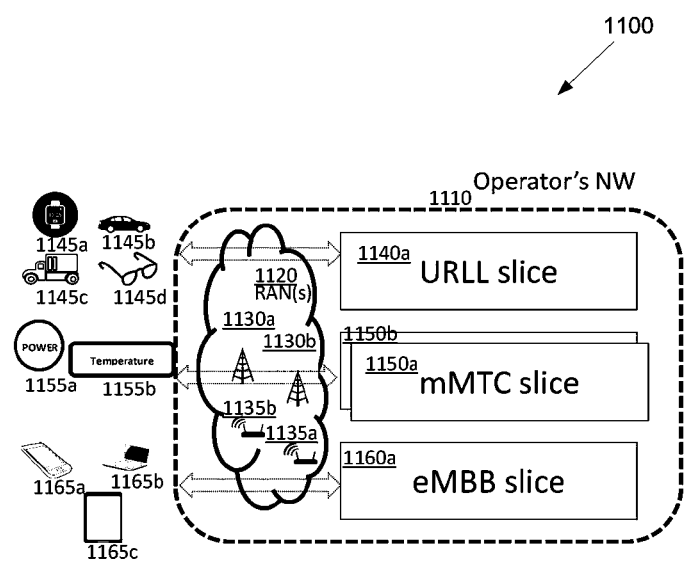
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the block diagram 100.

In order for the 5G network to support such diverse services with different quality of services (QoS), one scheme has been identified in LTE specification, called network slicing.

As shown in FIG. 11, An operator's network 1110 includes a number of radio access network(s) 1120 (RAN(s)) that are associated with network devices such as eNBs 1130a and 1130b, small cell base stations (femto/pico eNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

From LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, in LTE specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in LTE specification, which, at the very least, can serve as a good starting point to design advanced CSI scheme in NR MIMO. Compared to LTE specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for LTE eFD-MIMO. Such high throughput requirements can only be satisfied by a mechanism to provide very accurate CSI to the eNB.

In one example of beamforming, following the trend established in FD-MIMO, NR MIMO system may be beamformed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

This disclosure of invention covers several components which can be used in conjunction or in combination with one another, or can operate as standalone schemes.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals.

Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 12:
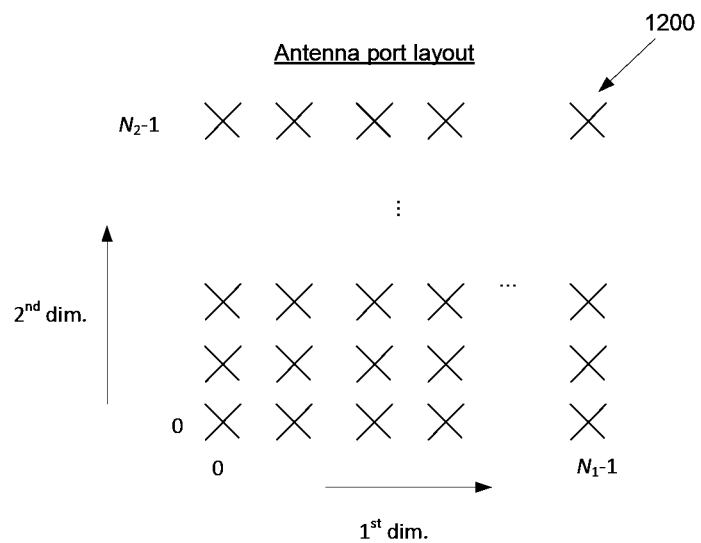
FIG. 12 illustrates an example 2D antenna port layout according to embodiments of the present disclosure.

FIG. 12 illustrates an example 2D antenna port layout 1200 according to embodiments of the present disclosure. The embodiment of the 2D antenna port layout 1200 illustrated in FIG. 12 is for illustration only. FIG. 12 does not limit the scope of this disclosure to any particular implementation.

In the following, it is assumed that $N_1$ and $N_2$ are the number of antenna ports with the same polarization in the first and second dimensions, respectively. For 2D antenna port layouts, it is determined that $N_1 > 1$, $N_2 > 1$, and for 1D antenna port layouts, it could have $N_1 > 1$ and $N_2 = 1$ or $N_2 > 1$ and $N_1 = 1$. In the rest of the disclosure, 1D antenna port layouts with $N_1 > 1$ and $N_2 = 1$ is considered. The disclosure, however, is applicable to the other 1D port layouts with $N_2 > 1$ and $N_1 = 1$. For a dual-polarized antenna port layout, the total number of antenna ports is $2N_1N_2$.

In one embodiment, a dual-stage $W = W_1 W_2$ codebook for high-resolution CSI reporting is provided. In such embodiment, $W_1$ codebook is used to select: an orthogonal basis set comprising of uniformly spaced $(L_1, L_2)$ DFT beams; $L \in \{2, 3, 4, 6, 8\}$ beams freely out of the $L_1 L_2$ DFT beams in a basis set; and/or per layer strongest beam out of L beams and two polarizations. In such instance, L is either (e.g. RRC) configurable or UE reports a preferred L value. This selection is WB or partial band (e.g. a set of SBs). Two examples of basis set sizes are restricted orthogonal basis set in which $L_1 L_2 = \min(8, N_1 N_2)$ and full orthogonal basis set in which $L_1 L_2 = N_1 N_2$, one of the two is either supported in the specification or configured via RRC signaling.

In such embodiment, $W_2$ codebook is used to combine L beams independently per layer with a common $W_1$ beam group, i.e., the selected L beams are the same for all layers and two polarizations, but strongest beam selection is per layer. The amplitude and phase of the combining coefficients are reported separately where phase is reported per subband (SB) and amplitude is reported wideband (WB) or SB or both WB and SB. The number of SBs can be configured, and a WB report implies a report that is common for all SBs.

In one embodiment, a UE is configured with a high-resolution CSI codebook in which the rank R pre-coding matrix is given by $$W = \frac{1}{\sqrt{R}} [W^{(0)} \ W^{(1)} \ \ldots \ W^{(R-1)}]$$

where the pre-coding vector for layer l is given by $$W^{(l)} = \frac{W_1^{(l)} W_2^{(l)}}{\|W_1^{(l)} W_2^{(l)}\|}, \text{ where: } W_1^{(l)} = \begin{bmatrix} B_l & 0 \\ 0 & B_l \end{bmatrix} P_{1,l}$$

if the strongest beam corresponds to one polarization, e.g. polarization 0 (or +45);

$$W_1^{(l)} = \begin{bmatrix} 0 & B_l \\ B_l & 0 \end{bmatrix} P_{1,l}$$

if the strongest beam corresponds to other polarization, e.g. polarization 1 (or −45); and $W_2^{(l)} = P_{2,l} c_l$.

The matrices $B_l$, $P_{1,l}$, $P_{2,l}$, and vector $c_l$ are defined as follows. In one example, $B_l$ is a $N_1 N_2 \times L$ basis matrix $[b_{k_{l,1}^{(0)}, k_{l,2}^{(0)}}, \ldots, b_{k_{l,1}^{(L-1)}, k_{l,2}^{(L-1)}}]$ common to both polarizations where $b_{k_{l,1}^{(i)}, k_{l,2}^{(i)}}$ is one of the L orthogonal DFT beams selected from the selected $(L_1, L_2)$ basis set, and $\{(k_{l,1}^{(i)}, k_{l,2}^{(i)}): i=0, 1 \ldots, L-1\}$ are corresponding indices of L beams where $(k_{l,1}^{(0)}, k_{l,2}^{(0)})$ is the strongest beam for layer l. Note that for rank $R > 1$, the strongest beam can be different for different layers, hence the index of the strongest beam is indicated per layer and this indication is WB.

In one example, $P_{1,l}$ is a 2L×2L diagonal matrix with diagonal elements [1 $p_{1,l,1}$ ... $p_{1,l,L-1}$ $p_{1,l,L}$ $p_{1,l,L+1}$ ... $p_{1,l,2L-1}$], each belonging to [0, 1], to indicate WB component of the relative beam power levels across L beams and two polarizations.

In one example, $P_{2,l}$ is a 2L×2L diagonal matrix with diagonal elements [1 $p_{2,l,1}$ ... $p_{2,l,L-1}$ $p_{2,l,L}$ $p_{2,l,L+1}$ ... $p_{2,l,2L-1}$], each belonging to [0, 1], to indicate SB component of the relative beam power levels across L beams and two polarizations.

In one example, $c_l$ is a 2L×1 vector [1 $c_{l,1}$ ... $c_{l,L-1}$ $c_{l,L}$ $c_{l,L+1}$ ... $c_{l,2L-1}]^T$, where $$c_{l,i} = \exp\left(\frac{j2\pi n}{2^N}\right)$$

$\forall i; n \in \{0, 1, \ldots, 2^N-1\}, N \in \{2, 3, 4\}$, to indicate SB relative phase of coefficients across L beams and two polarizations.

Note that one of the diagonal elements of $P_{1,l}$, $P_{2,l}$, and elements of $c_l$ is exactly one which corresponds to the strongest beam whose coefficient (both power and phase) can be assumed to be one in general. Also, if only WB components of relative beam power levels are reported, then $P_{2,l}$ is an identity matrix (hence not reported). Likewise, if only SB components of relative beam power levels are reported, then $P_{1,l}$ is an identity matrix (hence not reported).

In the present disclosure, the bit allocation to report amplitudes or beam power levels, $p_{1,l,i}$ and $p_{2,l,i}$, and relative phase $c_{l,i}$, where $0 \leq i \leq 2L-1$, are considered. In particular, the focus is on the case in which unequal number of bits are allocated to report $p_{1,l,i}$, $p_{2,l,i}$, and $c_{l,i}$.

In the rest of the present disclosure, $p_{1,l,i}$ and $p_{2,l,i}$ are referred to as amplitudes of beam combining coefficients or weights. They can also be referred to as beam power levels. Also, $p_{1,l,i}$, $p_{2,l,i}$, and $c_{l,i}$ can equivalently be referred to as wideband amplitude coefficient, subband amplitude coefficient, and subband phase coefficient, respectively. Likewise, $p_{1,l,i}$ and $p_{2,l,i}$ can equivalently be referred to as a first amplitude coefficient and a second amplitude coefficient, respectively.

In some embodiment 0, a UE is configured with a high-resolution CSI codebook $W=W_1 W_2$ as explained above in which at least one of $p_{2,l,i}$ and $c_{l,j}$ are quantized as follows. In one example of Sorting, the 2L coefficients per layer are sorted in decreasing order. Let $\tilde{p}_{1,l,i}$ and $\tilde{p}_{2,l,i}$ denote amplitudes $p_{1,l,i}$ and $p_{2,l,i}$ after sorting, and $\tilde{c}_{l,i}$ denote phase $c_{l,i}$ after sorting. Note that since the coefficients can be normalized with the strongest coefficient (which corresponds to the largest amplitude), the coefficients can be assumed that $\tilde{p}_{1,l,0}=1$, $\tilde{p}_{2,l,0}=1$, and $\tilde{c}_{l,0}=1$, hence the coefficients are not reported.

In one example of amplitude quantization, to report amplitude of the i-th sorted coefficient (where i>0), the ratio between i-th and (i−1)-th sorted amplitudes, $$r_{1,l,i} = \frac{p_{1,l,i}}{p_{1,l,i-1}},$$

is quantized, where i>0, where $\hat{r}_{1,l,i}$ denotes the quantized ratio of sorted amplitudes. To reconstruct the i-th sorted amplitude, the multiplication $\hat{r}_{1,l,i}\hat{r}_{1,l,i-1}$ is considered, where $\hat{r}_{1,l,i}=1$. The quantized ratio $\hat{r}_{2,l,i}$ for $$r_{2,l,i} = \frac{p_{2,l,i}}{p_{2,l,i-1}}$$

can be defined similarly. Let N is the number of bits to quantize each amplitude. The amplitude quantization codebook is either $C_0$ or $C_1$ which are defined as follows: if N=0, then $C_0=C_1=\{1\}$; if N=1, then $C_0=\{1, \sqrt{0.5}\}$ and $C_1=\{1,0\}$; if N=2, then $C_0=\{1, \sqrt{0.5}, \sqrt{0.25}, \sqrt{0.125}\}$ and $C_1=\{1, \sqrt{0.5}, \sqrt{0.25}, 0\}$; and if N=3, then $C_0=\{1, \sqrt{0.5}, \sqrt{0.25}, \sqrt{0.125}, \sqrt{0.0625}, \sqrt{0.0313}, \sqrt{0.0156}, \sqrt{0.0078}\}$ and $C_1=\{1, \sqrt{0.5}, \sqrt{0.25}, \sqrt{0.125}, \sqrt{0.0625}, \sqrt{0.0313}, \sqrt{0.0156}, 0\}$.

In one example of phase quantization, to report phase of the i-th sorted coefficient $\tilde{c}_{l,i}$ (where i>0), $2^K$-PSK alphabet is considered where K=0, 1, 2, 3.

The coefficient sorting information is reported either WB or SB. The reporting can be fixed, for example to WB. Alternatively, the UE is configured with one of WB or SB reporting via 1-bit higher layer RRC or dynamic MAC CE or DCI based signaling.

When reported WB, the coefficient sorting information is reported either jointly with at least one WB CSI reports such as RI and WB beam selection, or separately as an independent WB CSI report. Similarly, when reported SB, the coefficient sorting information is reported either jointly with at least one SB CSI reports such as SB amplitude and SB phase, or separately as an independent SB CSI report.

Also, the coefficient sorting information is reported either common for all layers or independent per layer. In one scheme, one of the two sorting alternatives is fixed, for example to per layer sorting. Alternatively, the UE is configured with one of the two sorting alternatives via 1-bit higher layer RRC or dynamic MAC CE or DCI based signaling.

In some embodiments 1, a UE is configured with a high-resolution CSI codebook in which amplitudes $p_{1,l,i}$ and/or $p_{2,l,i}$ for layer l and coefficient i are quantized according to the aforementioned embodiments 0. In addition, the amplitude sorting is WB according to at least one of the following alternatives. In one example of Alt 1-0, the amplitude sorting is common across two polarizations and common across all layers. For example, for 2-layer CSI reporting, the number of bits to report WB sorting information is $\lceil \log_2(L!) \rceil$, where $L!=L\times(L-1)\times \ldots \times 2\times 1$. For L=4, this requires 5 bits. In another example of Alt 1-1, the amplitude sorting is common across two polarizations and independent across all layers. For example, for 2-layer CSI reporting, the number of bits to report WB sorting information is $2\times\lceil \log_2(L!) \rceil$. For L=4, this requires 10 bits.

In yet another example of Alt 1-2, the amplitude sorting is independent across two polarizations and common across all layers. For example, for 2-layer CSI reporting, the number of bits to report WB sorting information is $\lceil \log_2((2L)!) \rceil$, where $(2L)!=2L\times(2L-1)\times \ldots \times 2\times 1$. For L=4, this requires 16 bits.

In yet another example of Alt 1-3, the amplitude sorting is independent across two polarizations and independent across all layers. For example, for 2-layer CSI reporting, the number of bits to report WB sorting information is $2\times\lceil \log_2((2L)!) \rceil$. For L=4, this requires 32 bits.

The amplitude sorting information is reported either jointly with at least one WB CSI reports such as RI and WB beam selection, or separately as an independent WB CSI report.

For WB only amplitude ($p_{1,l,i}$) reporting or SB only amplitude ($p_{2,l,i}$) reporting, at least the following amplitude sorting methods can be considered. In one method, only one of Alt 1-0 to Alt 1-3 is supported in the specification, e.g. Alt 1-0 or Alt 1-3. In another method, only two of Alt 1-0 to Alt 1-3 are supported in the specification, e.g. Alt 1-0 and Alt 1-3 or Alt 1-0 and Alt 1-2. In yet another method, all of Alt 1-0 to Alt 1-3 is supported in the specification. When multiple alternatives are supported, the UE is either configured with one of them or UE reports a preferred alternative as part the CSI report.

When both WB ($p_{1,l,i}$) and SB ($p_{2,l,i}$) amplitude are reported, the amplitude is either: common for both WB and SB amplitude components according to at least one of Alt 1-0 to Alt 1-3; or independent for WB and SB amplitude components according to at least one of Alt 1-0 to Alt 1-3. Note that the sorting information reporting payload is doubled in this case.

Note that there is no need to report the strongest beam as part of the WB report since the strongest beam is already included in the amplitude sorting information which is reported WB.

In sub-embodiment 1-0, the phase sorting follows amplitude sorting.

Let $N_{1,l,i}$ and $N_{2,l,i}$ respectively be the number of bits to quantize WB ($r_{1,l,i}$) and SB ($r_{2,l,i}$) amplitude ratio or WB ($p_{1,l,i}$) and SB ($p_{2,l,i}$) amplitude for layer l and coefficient i as explained in the aforementioned embodiments 0. It is worth noting that the strongest amplitude, $r_{1,l,i}$ or $r_{2,l,0}$, can be assumed be 1 and hence not reported, i.e. 0 bit is assigned to report them.

In some embodiment 2, 2 layer CSI reporting for simplicity may be assumed. The embodiment, however, is applicable to more than 2 layers. In such embodiments, the number of bits to quantize the remaining 2L−1 amplitude ratios (for each layer) is according to at least one of the following alternatives.

In one example of Alt 2-0, it is common for all amplitudes, regardless of the sorting alternative, i.e., a single value for $N_{1,l,i}$ (or $N_{2,l,i}$) is used for each layer l and coefficient i. The single value is either fixed, e.g. to 3 bits, or configured via RRC signaling, or UE reports as part of the CSI report (WB report).

In another example of Alt 2-1, it is independent for all amplitudes, regardless of the sorting alternative. In one instance of Alt 1-0 of amplitude sorting, L−1 values $N_{1,l,1} \ldots N_{1,l,L-1}$ (or $N_{2,l,i}, \ldots N_{2,l,L-1}$) respectively are used for both amplitude indices i=1, . . . , L−1, and indices i= L+1, . . . , 2L−1 and for all layers l. In one instance of Alt 1-1 of amplitude sorting, for Layer 0, L−1 values $N_{1,0,1}, \ldots N_{1,0,L-1}$ (or $N_{2,0,1}, \ldots N_{2,0,L-1}$) respectively are used for both amplitude indices i=1, . . . , L−1, and indices i=L+1, . . . , 2L−1. In one instance of Alt 1-1 of amplitude sorting, for Layer 1, . . . , L−1 values $N_{1,1,1}, \ldots N_{1,1,L-1}$ (or $N_{2,1,i}, \ldots N_{2,1,L-1}$) respectively are used for both amplitude indices i=1, . . . , L−1, and indices i=L+1, . . . , 2L−1.

In one instance of Alt 1-2 of amplitude sorting, 2L−1 values $N_{1,l,1}, \ldots N_{1,l,2L-1}$ (or $N_{2,l,1}, \ldots N_{2,l,2L-1}$) respectively are used for amplitude indices i=1, . . . , 2L−1, and for all layers l.

In one instance of Alt 1-3 of amplitude sorting, for Layer 0, 2L−1 values $N_{1,0,1}, \ldots N_{1,0,2L-1}$ (or $N_{2,0,1}, \ldots N_{2,0,2L-1}$) respectively are used for amplitude indices i=1, . . . , 2L−1. In one instance of Alt 1-3 of amplitude sorting, for Layer 1, 2L−1 values $N_{1,1,1}, \ldots N_{1,1,2L-1}$ (or $N_{2,1,1}, \ldots N_{2,1,2L-1}$) respectively are used for amplitude indices i=1, . . . , 2L−1.

The values for $N_{1,l,i}$ (or $N_{2,l,i}$) are either fixed, e.g. from {0, 1, 2, 3} bits, or configured via RRC signalling, or UE reports as part of the CSI report (WB report).

In one example of Alt 2-2, amplitudes are partitioned into multiple disjoint sets and each set is assigned a single value for amplitude reporting bits independently. A few examples of two sets are as follows. In one instance of Ex 2-0, the number of sets is 2, where the first set has $L_1=\lceil M/2 \rceil$ or $\lfloor M/2 \rfloor$ amplitudes, and the second set has $L_2=M-L_1$ amplitudes, where M=L or 2L depending on the amplitude sorting alternatives in the aforementioned embodiment 1.

In one instance of Ex 2-1, the number of sets is 2, where the first set has $L_1=L$ amplitudes that correspond to the stronger L out of 2L coefficients, and the second set has the remaining $L_2=L$ amplitudes that correspond to weaker L out of 2L coefficients, where amplitude sorting alternatives 1-2 and 1-3 in the aforementioned embodiments 1 have been assumed.

In one instance of Ex 2-2, the number of sets is 2, where the first set has all but the weakest amplitude (corresponds to the M-th amplitude), and the second set has the weakest amplitude (the M-th amplitude).

In one instance of Ex 2-3, the number of sets is 2, where the first set has all but the strongest amplitude (corresponds to the $1^{st}$ amplitude), and the second set has the strongest amplitude (the $1^{st}$ amplitude).

In one instance of Ex 2-4, the number of sets is L corresponding to each of L beams. In case of Alt 1-2 and 1-3, the number of bits for amplitude quantization is common for the two amplitudes corresponding to the same beam.

In sub-embodiment 2-0, the bit allocation to quantize phase of 2L−1 coefficients follows that to quantize amplitude according to at least one of Alt 2-0 to Alt 2-3.

Unless stated otherwise, the rest of the present disclosure is about bit allocation alternatives and are applicable to both amplitude and phase quantization. For brevity, only amplitude is mentioned in the following embodiments. Also, the bit allocation alternatives for $N_{1,l,0}, \ldots N_{1,l,2L-1}$ is explained. The alternatives however are also applicable for the bit allocation for $N_{2,l,0}, \ldots N_{2,l,2L-1}$.

In some embodiments 3, amplitudes or/and phases are partitioned into two disjoint sets according to Alt 2-2 in the aforementioned embodiments 2, where each set has equal number (L) of coefficients, and the following bit allocation is used for $N_{1,l,0}, \ldots N_{1,l,2L-1}$ (for WB amplitude), $N_{2,l,0}, \ldots N_{2,l,2L-1}$ (for SB amplitude), and $M_{l,0}, \ldots M_{l,2L-1}$ (for SB phase).

Note that the coefficient indices i=0, 1, . . . 2L−1 correspond to the sorted coefficients. In one example, for the first leading beam or coefficient out of 2L beams or coefficients, $(N_{1,l,0}, N_{2,l,0}, M_{l,0})=(0,0,0)$, i.e., the amplitude and phase of the leading beam coefficient is not reported, and, e.g. the leading beam coefficient is set to 1, where "leading" can also refer to the coefficient with the largest amplitude (also referred to as the strongest coefficient later in the disclosure). In one example for wideband amplitude+subband amplitude reporting: $(N_{1,l,i}, N_{2,l,i}, M_{l,i})=(P,1,3)$ for the first L−1 (out of 2L beams or coefficients) stronger beams or coefficients, i.e., i=1, . . . , L−1; $(N_{1,l,i}, N_{2,l,i}, M_{l,i})=(P,0,2)$ for the remaining L (out of 2L beams or coefficients) weaker beams or coefficients, i.e., i=L, . . . , 2L−1; and/or P=2 or 3.

In one example for subband only amplitude reporting: $N_{1,l,i}=0$ for all i; $(N_{2,l,i}, M_{l,i})=(1,3)$ for the first L−1 (out of 2L beams or coefficients) stronger beams or coefficients, i.e., i=1, . . . , L−1; and/or $(N_{2,l,i}, M_{l,i})=(1,2)$ for the remaining L (out of 2L beams or coefficients) weaker beams or coefficients, i.e., i=L, . . . , 2L−1.

In one example for wideband only amplitude reporting: $N_{2,l,i}=0$ for all i; and/or $(N_{1,l,i}, M_{l,i})=(P, Q)$, where P, Q=2 or 3.

In sub-embodiment 3-0, the bit allocation in the aforementioned embodiments 3 is applicable for all L values.

In sub-embodiment 3-1, the bit allocation in the aforementioned embodiments 3 is applicable for all L>R, where R=2 or 3 for example. In this case for L≤R, equal bit allocation is used for all coefficients i=1, . . . , 2L−1.

In some embodiments 3A, amplitudes or/and phases are partitioned into two disjoint sets according to Alt 2-2 in the aforementioned embodiments 2, where each set has K number of coefficients, and the following bit allocation is used for $N_{1,l,0}, \ldots N_{1,l,2L-1}$ (for WB amplitude), $N_{2,l,0}, \ldots N_{2,l,2L-1}$ (for SB amplitude), and $M_{l,0}, \ldots M_{l,2L-1}$ (for SB phase). Note that the coefficient indices i=0, 1, . . . , 2L−1 correspond to the sorted coefficients.

In one example for the first leading beam or coefficient out of 2L beams or coefficients, $(N_{1,l,0}, N_{2,l,0}, M_{l,0})=(0,0,0)$.

In one example for wideband amplitude+subband amplitude reporting: $(N_{1,l,i}, N_{2,l,i}, M_{l,i})=(P,1,3)$ for the first K−1 (out of 2L beams or coefficients) stronger beams or coefficients, i.e., i=1, . . . , K−1; $(N_{1,l,i}, N_{2,l,i}, M_{l,i})=(P,0,2)$ for the remaining 2L−K (out of 2L beams or coefficients) weaker beams or coefficients, i.e., i=K, . . . , 2L−1; and/or P=2 or 3.

In one example for subband only amplitude reporting: $N_{1,l,i}=0$ for all i; $(N_{2,l,i}, M_{l,i})=(1,3)$ for the first K−1 (out of 2L beams or coefficients) stronger beams or coefficients, i.e., i=1, . . . , K−1; and/or $(N_{2,l,i}, M_{l,i})=(1,2)$ for the remaining 2L−K (out of 2L beams or coefficients) weaker beams or coefficients, i.e., i=K, . . . , 2L−1.

In one example for wideband only amplitude reporting: $N_{2,l,i}=0$ for all i; and/or $(N_{1,l,i}, M_{l,i})=(P, Q)$, where P,Q=2 or 3.

A few alternatives for K are as follows: Alt 3A-0: K=2 for all L; Alt 3A-1: K=L for all L; Alt 3A-2: K=2L for L=2 and K=L for L>2; Alt 3A-3: K=2L for L<3 and K=L for L>3; Alt 3A-4: K=2L for L<4 and K=L for L>4, for example 6 or 8; Alt 3A-5: K is configured via higher layer (RRC) signaling; Alt 3A-6: K is configured via MAC CE based signaling; Alt 3A-7: K is configured via DCI (DL-related or UL related) signaling; Alt 3A-8: K value for WB only amplitude reporting is the same as that for WB+SB amplitude reporting and is according to one of Alt 3A-0 to Alt 3A-7; Alt 3A-9: K value for WB only amplitude reporting is different from that for WB+SB amplitude reporting, and two different K values one each for WB only amplitude reporting and WB+SB amplitude reporting are used according to one of Alt 3A-0 to Alt 3A-7; and Alt 3A-10: K is according to a combination of at least two of Alt 3A-0 through Alt 3A-9.

In some embodiments 3B, a UE is configured to report wideband amplitude with or without subband amplitude via higher-layer RRC signaling, wherein the bit allocation for (wideband amplitude, subband amplitude, subband phase quantization) with $(N_{1,l,i}, N_{2,l,i}, M_{l,i})$ bits is as follows. In one example for the leading (strongest) coefficient (corresponds to i=0) out of 2L coefficients, $(N_{1,l,0}, N_{2,l,0}, M_{l,0})=(0,0,0)$, and the leading (strongest) coefficient=1.

In one example for wideband+subband amplitude reporting: $(N_{1,l,i}, N_{2,l,i})=(3,1)$ and $M_{l,i} \in \{2,3\}$ for the first K−1 leading (strongest) coefficients out of the remaining 2L−1 coefficients (excluding the strongest coefficient), i.e., i=1, . . . , K−1; where one of the two M values is configured via higher-layer RRC signaling; $(N_{1,l,i}, N_{2,l,i}, M_{l,i})=(3,0,2)$ for the remaining 2L−K (out of 2L−1 coefficients) weaker coefficients, i.e., i=K, . . . , 2L−1; and/or K=2, 3, . . . 2L.

In one example for wideband-only amplitude, i.e. $N_{2,l,i}=0$: $(N_{1,l,i}, N_{2,l,i})=(3,0)$ and $M_{l,i} \in \{2,3\}$; where one of the two M values is configured via higher-layer RRC signaling; and/or the strongest coefficient out of 2L coefficients is reported per layer in a WB manner.

In some embodiments 3C, the supported values of $L \in \{2, 3, 4\}$ and the value of K in the aforementioned embodiment 3B is according to at least one of the following alternatives. In one example of Alt 3C-0, only one fixed value for each value of L; one of the following examples is fixed in the specification: Example 3C-0: K=L for all L; Example 3C-1: K=2L for L=2, and K=L for L=3,4; Example 3C-2: K=2L for L=2,3, and K=L for L=4; Example 3C-3: K=L+1 for all L; Example 3C-4: K=2L for L=2, and K=L+1 for L=3,4; Example 3C-5: K=2L for L=2,3, and K=L+1 for L=4; Example 3C-6: K=2L for L=2, K=L for L=3, and K=L+1 for L=4; Example 3C-7: K=2L for L=2, K=L+1 for L=3, and K=L for L=4; Example 3C-8: K=L for L=2, K=L for L=3, and K=L+1 for L=4; Example 3C-9: K=L for L=2, K=L+1 for L=3, and K=L+1 for L=4; Example 3C-10: K=L for L=2, K=L+1 for L=3, and K=L for L4; Example 3C-11: K=L+2 for all L; Example 3C-12: K=2L for L=2, and K=L+2 for L=3, 4; Example 3C-13: K=2L for L=2,3, and K=L+2 for L=4; Example 3C-14: K=2L for L=2, K=L+1 for L=3, and K=L+2 for L=4, i.e., K=4, 4, and 6, for L=2, 3, and 4, respectively; and Example 3C-14: K=2L, K=L+2 for L=3, and K=L+1 for L=4.

In one example of Alt 3C-1, multiple K values for some or all values of L and one K value is either configured via RRC signaling or the UE reports a preferred K value as a WB report.

In some embodiments 3D, for wideband+subband amplitude quantization, one of equal bit allocation or unequal bit allocation is used depending on the K value in the aforementioned embodiments 3B and embodiments 3C.

In one example, if K=2L, then the equal bit allocation is used for both amplitude and phase, and in this case the following amplitude quantization method is used: the leading (strongest) coefficient (corresponds to i=0) out of 2L coefficients is reported per layer in a WB manner (as a WB report). This requires $\lceil \log_2(2L) \rceil$ bits per layer. For L=4, it is 3 bits for rank 1 and 6 bits for rank 2 CSI reporting; and the amplitude quantization is independent for each of the remaining 2L−1 coefficients (i.e., dependent quantization such as the differential across coefficients as proposed in the aforementioned embodiments 0 is not used).

In one example, if K<2L, one of following amplitude quantization alternatives is used. In one instance of Alt 3D-0, 2L coefficients are reported according to the descending order of the reported WB amplitudes independently for each layer, where the grouping information is reported implicitly with the WB amplitude report. This requires $\lceil \log_2((2L)!) \rceil$ bits per layer. For L=4, it is 16 bits for rank 1 and 32 bits for rank 2 CSI reporting.

In one instance of Alt 3D-1, 2L coefficients are grouped in two, where grouping information is reported in a WB manner independently for each layer. In addition, the leading (strongest) coefficient (corresponds to i=0) is reported (WB report) implicitly or explicitly as the strongest coefficient belonging to the first coefficient group. In such instance, the first group corresponds to K leading (strongest) coefficients out of 2L coefficients. In such instance, the second group corresponds to the remaining coefficients.

For each layer, this requires $\lceil \log_2 \binom{2L}{K} \rceil$ bits to report the first group and $\lceil \log_2 K \rceil$ bits to report the leading (strongest) coefficient. Note there is no reporting needed for the second group. For L=4 and K=5, it requires 6 bits to report the first group and 3 bits to report the leading coefficient per layer, which is 9 bits in total for rank 1 and 18 bits for rank 2 CSI reporting, respectively.

In one instance of Alt 3D-2, 2L coefficients are grouped in three, where grouping information is reported in a WB manner independently for each layer. In such instance, the first group corresponds to the leading (strongest) coefficient (corresponds to i=0) out of 2L coefficients. In such instance, the second group corresponds to K−1 leading (strongest) coefficients out of the remaining 2L−1 coefficients (excluding the strongest coefficient). In such instance, the third group corresponds to the remaining coefficients.

For each layer, this requires $\lceil \log_2(2L) \rceil$ bits to report the leading (strongest) coefficient and $\lceil \log_2({}_{K-1}{}^{2L-1}) \rceil$ bits to report the first group. Note there is no reporting needed for the second group. For L=4 and K=5, it requires 3 bits to report the leading coefficient per layer and 6 bits to report the first group, which is 9 bits in total for rank 1 and 18 bits for rank 2 CSI reporting, respectively.

In one example of Alt 3D-3, the leading (strongest) coefficient (corresponds to i=0) out of 2L coefficients is reported per layer in a WB manner (as a WB report). The first group (K−1 strongest coefficients per layer that use a larger bit allocation) is then determined directly from the reported WB amplitudes, without any explicit reporting, based on a fixed rule. A few examples of a fixed rule are as follows.

In one instance of Ex 3D-0, the reported WB amplitudes for the remaining 2L−1 coefficient are sorted in decreasing order, and the first K−1 of the sorted amplitudes form the first group and the remaining sorted amplitudes form the second group. If the WB amplitudes for two coefficients are identical, then the WB amplitudes are sorted in increasing order of coefficient index i, i.e., if $a_k$ and $a_r$ are two WB amplitudes for coefficient k, r∈{1, 2, ... 2L−1}, then $a_k$ and $a_r$ are sorted as ..., $a_k$, $a_r$, ... if k<r and as ..., $a_r$, $a_k$, ... otherwise.

In one instance of Ex 3D-1, the reported WB amplitudes for the remaining 2L−1 coefficient are sorted in decreasing order, and the first K−1 of the sorted amplitudes form the first group and the remaining sorted amplitudes form the second group. If the WB amplitudes for two coefficients are identical, then the WB amplitudes are sorted in decreasing order of coefficient index i, i.e., if $a_k$ and $a_r$ are two WB amplitudes for coefficient k, r∈{1, 2, ... 2L−1}, then $a_k$ and $a_r$ are sorted as ..., $a_k$, $a_r$, ... if k>r and as ..., $a_r$, $a_k$, ... otherwise The amplitude quantization in this case (K<2L) is either dependent (i.e., differential as proposed in the aforementioned embodiments 0) or independent for each of the remaining 2L−1 coefficients. One of the two amplitude quantization methods may be used in the specification.

In some embodiments 3E, for both wideband only and wideband+subband amplitude quantization (depending on RRC configuration, cf. the aforementioned embodiments 3B), amplitude quantization is independent for each of the remaining 2L−1 coefficients and for each layer. The codebook for amplitude quantization is as follows.

In one example of WB amplitude codebook, $C_{WB}$={1, $\sqrt{0.5}$, $\sqrt{0.25}$, $\sqrt{0.125}$, $\sqrt{0.0625}$, $\sqrt{0.0313}$, $\sqrt{0.0156}$, 0} which corresponds to ={0, −3, −6, −9, −12, −15, −18, −∞} dB. An example of WB amplitude codebook table is shown in TABLE 1. Two alternatives are shown for indexing, one in increasing and the other in decreasing order of amplitudes, one of them may be fixed.

In one example of SB amplitude codebook, $C_{SB}$={1, $\sqrt{0.5}$} for the first group (for which $N_{2,l,i}$=1), which corresponds to ={0, −3} dB, and $C_{SB}$={1} for the second group (for which $N_{2,l,i}$=0, SB amplitude is not reported). An example of SB amplitude codebook table is shown in TABLE 2.

Two alternatives are shown for indexing, one in increasing and the other in decreasing order of amplitudes, one of them may be fixed. In a variation, there is no separate codebook for SB amplitude. The SB amplitude codebook corresponds to indices $I_{A,WB}$=6,7 (Alt 0) or 0,1 (Alt 1) in the WB amplitude codebook TABLE 1.

TABLE 1

| | WB amplitude codebook table | |
|---|---|---|
| Index | WB amplitude ($p_{1,l,i}$) | |
| ($I_{A,WB}$) | Alt 0 | Alt 1 |
| 0 | 0 | 1 |
| 1 | $\frac{1}{\sqrt{64}} = \sqrt{0.0156}$ | $\frac{1}{\sqrt{2}} = \sqrt{0.5}$ |
| 2 | $\frac{1}{\sqrt{32}} = \sqrt{0.0313}$ | $\frac{1}{\sqrt{4}} = \sqrt{0.25}$ |
| 3 | $\frac{1}{\sqrt{16}} = \sqrt{0.0625}$ | $\frac{1}{\sqrt{8}} = \sqrt{0.125}$ |
| 4 | $\frac{1}{\sqrt{8}} = \sqrt{0.125}$ | $\frac{1}{\sqrt{16}} = \sqrt{0.0625}$ |
| 5 | $\frac{1}{\sqrt{4}} = \sqrt{0.25}$ | $\frac{1}{\sqrt{32}} = \sqrt{0.0313}$ |
| 6 | $\frac{1}{\sqrt{2}} = \sqrt{0.5}$ | $\frac{1}{\sqrt{64}} = \sqrt{0.0156}$ |
| 7 | 1 | 0 |

TABLE 2

| | SB amplitude codebook table | |
|---|---|---|
| Index | SB amplitude ($P_{2,l,i}$) | |
| ($I_{A,SB}$) | Alt 0 | Alt 1 |
| 0 | $\frac{1}{\sqrt{2}} = \sqrt{0.5}$ | 1 |
| 1 | 1 | $\frac{1}{\sqrt{2}} = \sqrt{0.5}$ |

In some embodiments 3F, for both wideband only and wideband+subband amplitude quantization (depending on RRC configuration, cf. the aforementioned embodiments 3B), amplitude quantization is independent for each of the remaining 2L−1 coefficients and for each layer. The codebook for amplitude quantization is as follows.

In one example of WB amplitude codebook, $C_{WB}$={1, $\sqrt{0.6683}$, $\sqrt{0.4467}$, $\sqrt{0.2985}$, $\sqrt{0.1995}$, $\sqrt{0.1334}$, $\sqrt{0.0891}$, 0} which corresponds to ={0, −1.75, −3.5, ..., −10.5, −∞} dB. An example of WB amplitude codebook table is shown in TABLE 3. Two alternatives are shown for indexing, one in increasing and the other in decreasing order of amplitudes, one of them may be fixed.

In another example of SB amplitude codebook, $C_{SB}=\{\sqrt{1.4125}, \sqrt{0.7079}\}$ for the first group (for which $N_{2,l,i}=1$), which corresponds to $=\{1.5, -1.5\}$ dB, and $C_{SB}=\{1\}$ for the second group (for which $N_{2,l,i}=0$, SB amplitude is not reported). An example of SB amplitude codebook table is shown in TABLE 4. Two alternatives are shown for indexing, one in increasing and the other in decreasing order of amplitudes, one of them may fixed in a specification. In a variation, there is no separate codebook for SB amplitude. The SB amplitude codebook corresponds to indices $I_{A,WB}=6$, 7 (Alt 0) or 0, 1 (Alt 1) in the WB amplitude codebook table TABLE 3.

TABLE 3

WB amplitude codebook table

| Index ($I_{A,WB}$) | WB amplitude ($p_{1,l,i}$) | |
|---|---|---|
| | Alt 0 | Alt 1 |
| 0 | 0 | 1 |
| 1 | $\sqrt{0.0891}$ | $\sqrt{0.6683}$ |
| 2 | $\sqrt{0.1334}$ | $\sqrt{0.4467}$ |
| 3 | $\sqrt{0.1995}$ | $\sqrt{0.2985}$ |
| 4 | $\sqrt{0.2985}$ | $\sqrt{0.1995}$ |
| 5 | $\sqrt{0.4467}$ | $\sqrt{0.1334}$ |
| 6 | $\sqrt{0.6683}$ | $\sqrt{0.0891}$ |
| 7 | 1 | 0 |

TABLE 4

SB amplitude codebook table

| Index ($I_{A,SB}$) | SB amplitude ($p_{2,l,i}$) | |
|---|---|---|
| | Alt 0 | Alt 1 |
| 0 | $\sqrt{0.7079}$ | $\sqrt{1.4125}$ |
| 1 | $\sqrt{1.4125}$ | $\sqrt{0.7079}$ |

In some embodiments 3G, the WB amplitude codebook is according to one of Alt 0 and Alt 1 in TABLE 1 and the SB amplitude codebook is according to one of Alt 0 and Alt 1 in TABLE 4.

In some embodiments 3H, the WB amplitude codebook is according to one of Alt 0 and Alt 1 in TABLE 3 and the SB amplitude codebook is according to one of Alt 0 and Alt 1 in TABLE 2.

In some embodiments 3I, the WB amplitude codebook is according to one of Alt 0 and Alt 1 in TABLE 1 and the SB amplitude codebook is according to one of Alt 0 and Alt 1 in TABLE 5.

TABLE 5

SB amplitude codebook table

| Index ($I_{A,SB}$) | SB amplitude ($p_{2,l,i}$) | |
|---|---|---|
| | Alt 0 | Alt 1 |
| 0 | $\sqrt{1.4125}$ | 1 |
| 1 | 1 | $\sqrt{1.4125}$ |

In some embodiments, the WB amplitude codebook is according to one of Alt 0 and Alt 1 in TABLE 1 and the SB amplitude codebook is according to one of Alt 0 and Alt 1 in TABLE 6.

TABLE 6

SB amplitude codebook table

| Index (IA,sn) | SB amplitude ($p_{2,l,i}$) | |
|---|---|---|
| | Alt 0 | Alt 1 |
| 0 | $\sqrt{0.7079}$ | 1 |
| 1 | 1 | $\sqrt{0.7079}$ |

In some embodiments 3K, the WB amplitude codebook is according to one of Alt 0 and Alt 1 in TABLE 1 and two SB amplitude codebooks are supported, $\{1, \sqrt{x_1}\}$ and $\{1, \sqrt{x_2}\}$, where $x_1>1$ and $x_2<1$. In one example, the two SB codebooks are $\{1, \sqrt{1.4125}\}$ and $\{1, \sqrt{0.7079}\}$ and the corresponding SB codebook table is shown in TABLE 7. Another example is shown in TABLE 8. In both tables, two alternatives (Alt 0 and Alt 1) of index ($I_{A,SB}$) of SB amplitude ($p_{2,l,i}$) mapping is shown.

The reporting or configuration of SB Codebook Index ($I_{SB\_CB}$) are according to at least one of the following alternatives. In one example of Alt 3K-0, one of the two SB codebooks is fixed in the specification, for example, $\{1, \sqrt{0.7079}\}$. In another example of Alt 3K-1, one of the two SB codebooks is configured to the UE. For example, this configuration can be via 1-bit RRC sign baling or more dynamic MAC CE based or DCI based signaling.

In yet another example of Alt 3K-2, the UE reports one of the two SB codebooks as part of the CSI report where this reporting is in a WB manner. Also, this reporting can either be joint with at least one of other WB CSI reports (for example WB PMI or RI) or separate as a new WB CSI report. The WB reporting of $I_{SB\_CB}$ is according to at least one of the following sub-alternatives.

In one instance of Alt 3K-2-0, $I_{SB\_CB}$ is reported layer-common and coefficient-common and a 1-bit WB CSI report is reported common for all layers and common for all coefficients (K−1), where K is defined as in the aforementioned embodiments 3B.

In another instance of Alt 3K-2-1, $I_{SB\_CB}$ is reported layer-common and coefficient-independent and a 1-bit WB CSI report is reported common for all layers and independently for all coefficients (K−1), where K is defined as in the aforementioned embodiments 3B. So, the total number of WB reporting bits is K−1.

In yet another instance of Alt 3K-2-2, $I_{SB\_CB}$ is reported layer-independent and coefficient-common and a 1-bit WB CSI report is reported independently for all layers and common for all coefficients (K−1), where K is defined as in the aforementioned embodiments 3B. So, the total number of WB reporting bits is R, where R is the number of layers, (1 and 2 for rank 1 and rank 2, respectively).

In yet another instance of Alt 3K-2-3, $I_{SB\_CB}$ is reported layer-independent and coefficient-independent and a 1-bit WB CSI report is reported independently for all layers and independently for all coefficients (K−1), where K is defined as in the aforementioned embodiments 3B. So, the total number of WB reporting bits is R(K−1), where R is the number of layers, and hence for rank 1 and rank 2, the number of bits is (K−1) and 2(K−1), respectively.

TABLE 7

SB amplitude codebook table

| SB Codebook Index ($I_{SB\_CB}$) | Index ($I_{A,SB}$) | SB amplitude ($p_{2,l,i}$) Alt 0 | Alt 1 |
|---|---|---|---|
| 0 | 0 | $\sqrt{1.4125}$ | 1 |
|   | 1 | 1 | $\sqrt{1.4125}$ |
| 1 | 0 | $\sqrt{0.7079}$ | 1 |
|   | 1 | 1 | $\sqrt{0.7079}$ |

TABLE 8

SB amplitude codebook table

| SB Codebook Index ($I_{SB\_CB}$) | Index ($I_{A,SB}$) | SB amplitude ($p_{2,l,i}$) Alt 0 | Alt 1 |
|---|---|---|---|
| 0 | 0 | $\sqrt{0.7079}$ | 1 |
|   | 1 | 1 | $\sqrt{0.7079}$ |
| 1 | 0 | $\sqrt{1.4125}$ | 1 |
|   | 1 | 1 | $\sqrt{1.4125}$ |

The WB and SB amplitude quantization codebooks according to only one of the aforementioned embodiments 3E, 3F, 3G, 3H, 3I, 3J, and 3K will be specified in the present disclosure.

In some embodiments 3L, for 4 antenna ports (e.g. {3000, 3001, 3002, 3003}), 8 antenna ports (e.g. {3000, 3001, . . . , 3007}), 12 antenna ports (e.g. {3000, 3001, . . . , 3011}), 16 antenna ports (e.g. {3000, 3001, . . . , 3015}), 24 antenna ports (e.g. {13000, 3001, . . . , 3023}), and 32 antenna ports (e.g. {3000, 3001, . . . , 3031}), when the UE is configured with higher layer parameters CodebookType set to Type2_Parameters, where Type2_Parameters contains parameters {CodebookConfig-N1, CodebookConfig-N2, NumberOfBeams, PhaseAlphabetSize, SubbandAmplitude}.

In such embodiments, the values of $N_1$ and $N_2$ are configured with the higher-layer parameters CodebookConfig-N1 and CodebookConfig-N2, respectively. The number of CSI-RS ports, $P_{CSI-RS}$, is $2N_1N_2$. In such embodiments, the value of L is configured with the higher-layer parameter NumberOfBeams, where L=2 when $P_{CSI-RS}=4$ and L∈{2,3, 4} when $P_{CSI-RS}>4$. In such embodiments, the value of $N_{PSK}$ is configured with the higher-layer parameter PhaseAlphabetSize, where $N_{PSK} \in (4,8)$ with $N_{PSK}=4$ indicates QPSK phase codebook and $N_{PSK}=8$ indicates 8PSK phase codebook. In such embodiments, the UE is configured with the higher-layer parameter SubbandAmplitude set to OFF or ON.

When $\upsilon \leq 2$, where $\upsilon$ is the associated RI value, each PMI value corresponds to the codebook indices $i_1$ and $i_2$ where $$i_1 = \begin{cases} [i_{1,1}\ i_{1,2}\ i_{1,3,1}\ i_{1,4,1}] & v = 1 \\ [i_{1,1}\ i_{1,2}\ i_{1,3,1}\ i_{1,4,1}\ i_{1,3,2}\ i_{1,4,2}] & v = 2 \end{cases} \text{ and}$$

$$i_2 = \begin{cases} [i_{2,1,1}] & SubandAmplitude = OFF, v = 1 \\ [i_{2,1,1}\ i_{2,1,2}] & SubandAmplitude = OFF, v = 2 \\ [i_{2,1,1}\ i_{2,2,1}] & SubandAmplitude = ON, v = 1 \\ [i_{2,1,1}\ i_{2,2,1}\ i_{2,1,2}\ i_{2,2,2}] & SubandAmplitude = ON, v = 2 \end{cases}$$

The L vectors combined by the codebook are identified by the indices $i_{1,1}$ and $i_{1,2}$, where $$i_{1,1} = [q_1\ q_2] \qquad i_{1,2} = [n_1\ n_2]$$
$$q_1 \in \{0, 1, \ldots, O_1-1\} \text{ and } n_1 = [n_1^{(0)}, \ldots, n_1^{(L-1)}]$$
$$q_2 \in \{0, 1, \ldots, O_2-1\} \qquad n_2 = [n_2^{(0)}, \ldots, n_2^{(L-1)}]$$
$$n_1^{(i)} \in \{0, 1, \ldots, N_1-1\}$$
$$n_2^{(i)} \in \{0, 1, \ldots, N_2-1\}$$

The strongest coefficient on layer l, l=1, . . . , $\upsilon$ is identified by $i_{1,3,l} \in \{0, 1, \ldots, 2L-1\}$. The amplitude coefficient indicators $i_{1,4,l}$ and $i_{2,2,l}$ are $$i_{1,4,l} = [k_{l,0}^{(1)}, k_{l,1}^{(1)}, \ldots, k_{l,2L-1}^{(1)}]$$
$$i_{2,2,l} = [k_{l,0}^{(2)}, k_{l,1}^{(2)}, \ldots, k_{l,2L-1}^{(2)}]$$
$$k_{l,i}^{(1)} \in \{0, 1, \ldots, 7\}$$
$$k_{l,i}^{(2)} \in \{0, 1\}$$

for l=1, . . . , $\upsilon$.

The indicators $i_{1,4,l}$ and $i_{2,2,l}$ respectively indicate the WB and SB components of the coefficient amplitudes as explained earlier in the disclosure. The mapping from $k_{l,i}^{(1)}$ to the WB amplitude coefficient $p_{l,i}^{(1)}$ is given in TABLE 9 and the mapping from $k_{l,i}^{(2)}$ to the SB amplitude coefficient $p_{l,i}^{(2)}$ is given in TABLE 10.

The amplitude coefficients are represented by $$p_l^{(1)} = [p_{l,0}^{(1)}, p_{l,1}^{(1)}, \ldots, p_{l,2L-1}^{(1)}]$$
$$p_l^{(2)} = [p_{l,0}^{(2)}, p_{l,1}^{(2)}, \ldots, p_{l,2L-1}^{(2)}]$$

for l=1, . . . , $\upsilon$. Note that $p_{l,i}^{(1)}$ and $p_{l,i}^{(2)}$ respectively one-to-one map to $p_{1,l,i}\ p_{2,l,i}$ and used earlier (or later) in the disclosure for the WB and SB amplitude components.

TABLE 9

Mapping of elements of $i_{1,4,l}$: $k_{l,i}^{(1)}$ to $p_{l,i}^{(1)}$

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 10

Mapping of elements of $i_{2,2,l}$: $k_{l,i}^{(2)}$ to $p_{l,i}^{(2)}$

| $k_{l,i}^{(2)}$ | $p_{l,i}^{(2)}$ |
|---|---|
| 0 | $\sqrt{1/2}$ |
| 1 | 1 |

The phase coefficient indicators are $i_{2,1,l}=c_l=[c_{l,0}, c_{l,1}, \ldots, c_{l,2L-1}]$ for l=1, . . . , $\upsilon$. The amplitude and phase coefficient indicators are reported as follows. In one example, the indicators $k_{l,i_{1,3,l}}^{(1)}=7$, $k_{l,i_{1,3,l}}^{(2)}=1$, and $c_{l,i_{1,3,l}}=0$ (l=1, . . . , υ). $k_{l,i_{1,3,l}}^{(1)}$, $k_{l,i_{1,3,l}}^{(2)}$, $c_{l,i_{1,3,l}}$ and are not reported for l=1, . . . , υ.

In another example, the remaining 2L−1 elements of $i_{1,4,l}$ (l=1, . . . , υ) are reported, where $k_{l,i}^{(1)} \in \{0, 1, . . . , 7\}$. Let $M_l$ (l=1, . . . υ) be the number of elements of $i_{1,4,l}$ that satisfy $k_{l,i}^{(1)}>0$.

In yet another example, the remaining 2L−1 elements of $i_{2,1,l}$ and $i_{2,2,l}$ (l=1, . . . , υ) are reported as follows. In one instance, when SubbandAmplitude=OFF: $k_{l,i}^{(2)}=1$ for l=1, . . . , υ and i=0, 1, . . . , 2L−1. $i_{2,2,l}$ is not reported for l=1, . . . , υ; and for l=1, . . . , υ, the $M_l$−1 elements of $i_{2,1,l}$ corresponding to the coefficients that satisfy $k_{l,i}^{(1)}>0$, as determined by the reported elements of $i_{1,4,l}$, are reported, where $c_{l,i} \in \{0, 1, . . . , N_{PSK}−1\}$, and the remaining 2L−$M_l$ elements of $i_{2,1,l}$ are not reported and are set to $c_{l,i}=0$.

In another instance, when SubbandAmplitude=ON: for l=1, . . . , υ, the elements of $i_{2,2,l}$ and $i_{2,1,l}$ corresponding to the min($M_l$, $K^{(2)}$)−1 strongest coefficients, as determined by the corresponding elements of $i_{1,4,l}$, are reported, where $k_{l,i}^{(2)} \in \{0,1\}$ and $c_{l,i} \in \{0, 1, . . . , N_{PSK}−1\}$. The values of $K^{(2)}$ are given in TABLE 11. The remaining 2L−min($M_l$,$K^{(2)}$) elements of $i_{2,2,l}$ are not reported and are set to $k_{l,i}^{(2)}=1$. The elements of $i_{2,1,l}$ corresponding to the remaining $M_l$−min ($M_l$, $K^{(2)}$) coefficients satisfying $k_{l,i}^{(1)}>0$ are reported, where $c_{l,i} \in \{0, 1, 2, 3\}$. The remaining 2L−$M_l$ elements of $i_{2,1,l}$ are not reported and are set to $c_{l,i}=0$; and when two elements, $k_{l,x}^{(1)}$ and $k_{l,y}^{(1)}$, of the reported $i_{1,4,l}$ are identical ($k_{l,x}^{(1)}=k_{l,y}^{(1)}$), then the element min(x, y) is prioritized to be included in the set of the min ($M_l$,$K^{(2)}$)−1 strongest coefficients for $i_{2,2,l}$ and $i_{2,1,l}$ (l=1, . . . , υ) reporting. In another alternative, max(x,y) is prioritized to be included in the set of the min($M_l$,$K^{(2)}$)−1 strongest coefficients for $i_{2,2,l}$ and $i_{2,1,l}$ (l=1, . . . , υ) reporting.

TABLE 11

Full resolution subband coefficients when SubbandAmplitude = ON

| L | $K^{(2)}$ |
|---|---|
| 2 | 4 |
| 3 | 4 |
| 4 | 6 |

The phase coefficient is determined by the quantity $$\phi_{l,i} = \begin{cases} e^{j2\pi c_{l,i}/N_{PSK}} & SubbandAmplitude = OFF \\ e^{j2\pi c_{l,i}/N_{PSK}} & SubbandAmplitude = ON, \min(M_l, K^{(2)}) - 1 \text{ stronger coefficients} \\ e^{j2\pi c_{l,i}/4} & SubbandAmplitude = ON, M_l - \min(M_l, K^{(2)}) \text{ weaker coefficients} \end{cases}$$

In some embodiments 3M, for 4 antenna ports (e.g. {3000, 3001, 3002, 3003}), 8 antenna ports (e.g. {3000, 3001, . . . , 3007}), 12 antenna ports (e.g. {3000, 3001, . . . , 3011}), 16 antenna ports (e.g. {3000, 3001, . . . , 3015}), 24 antenna ports (e.g. {13000, 3001, . . . , 3023}), and 32 antenna ports (e.g. {3000, 3001, . . . , 3031}), when the UE is configured with higher layer parameters CodebookType set to Type2_Parameters, where Type2_Parameters contains parameters {CodebookConfig-N1, CodebookConfig-N2, NumberOfBeams, PhaseAlphabetSize, SubbandAmplitude, PortSelectionSamplingSize}.

In such embodiments, the number of CSI-RS ports is given by $P_{CSI-RS} \in \{4,8,12,16,24,32\}$. In such embodiments, the value of L is configured with the higher-layer parameter NumberOfBeams, where L=2 when $P_{CSI-RS}=4$ and $L \in \{2, 3, 4\}$ when $P_{CSI-RS}>4$. In such embodiments, the value of d is configured with the higher layer parameter PortSelectionSamplingSize, where $d \in \{1, 2, 3, 4\}$, $$d \le \frac{P_{CSI-RS}}{2} \text{ and } d \le L,$$

alternatively $$d \le \min\left(\frac{P_{CSI-RS}}{2}, L\right).$$

In such embodiments, the value of $N_{PSK}$ is configured with the higher-layer parameter PhaseAlphabetSize, where $N_{PSK} \in (4,8)$ with $N_{PSK}=4$ indicates QPSK phase codebook and $N_{PSK}=8$ indicates 8PSK phase codebook. In such embodiments, the UE is configured with the higher-layer parameter SubbandAmplitude set to OFF or ON.

When υ≥2, where υ is the associated RI value, each PMI value corresponds to the codebook indices $i_1$ and $i_2$ where $$i_1 = \begin{cases} [i_{1,1} \ i_{1,3,1} \ i_{1,4,1}] & v = 1 \\ [i_{1,1} \ i_{1,3,1} \ i_{1,4,1} \ i_{1,3,2} \ i_{1,4,2}] & v = 2 \end{cases} \text{ and}$$

$$i_2 = \begin{cases} [i_{2,1,1}] & SubandAmplitude = OFF, v = 1 \\ [i_{2,1,1} \ i_{2,1,2}] & SubandAmplitude = OFF, v = 2 \\ [i_{2,1,1} \ i_{2,2,1}] & SubandAmplitude = ON, v = 1 \\ [i_{2,1,1} \ i_{2,2,1} \ i_{2,1,2} \ i_{2,2,2}] & SubandAmplitude = ON, v = 2 \end{cases}.$$

The L antenna ports per polarization are selected by the index $i_{1,1}$, where $$i_{1,1} \in \left\{0, 1, \ldots, \left\lceil \frac{P_{CSI-RS}}{2d} \right\rceil - 1 \right\}.$$

The rest of the details are the same as in the aforementioned embodiments (e.g., embodiment 3L).

In some embodiments 4, for Alt 1-0 or Alt 1-1 of amplitude sorting, the bit allocation is common for each of L beams across two polarizations: for L=2 beams and max 2 bits/amplitude, the bit allocation is according to at least one alternative in TABLE 12; for L=2 beams and max 3 bits/amplitude, the bit allocation is according to at least one alternative in TABLE 13; for L=3 beams and max 2 bits/ amplitude, the bit allocation is according to at least one alternative in TABLE 14; for L=3 beams and max 3 bits/amplitude, the bit allocation is according to at least one alternative in TABLE 15; for L=4 beams and max 2 bits/amplitude, the bit allocation is according to at least one alternative in TABLE 16; and for L=4 beams and max 3 bits/amplitude, the bit allocation is according to at least one alternative in TABLE 17.

Note that if the number of bit $N_{1,l,i}=0$, then the amplitude is equal to 1 (strongest beam) and if $N_{1,l,i}>0$, then the amplitude codebook is as in the aforementioned embodiment 0. In these alternatives, the strongest beam is common for both of the two polarizations (i=0 and L), hence the corresponding amplitudes are not reported (assumed to be 1).

The UE is configured with an L value belonging to {2, 3, 4} and a max number of bits/amplitude value belonging to {2, 3}. This configuration is via higher layer RRC signaling. In another alternative, the UE reports a preferred L value (WB report) and a max number of bits/amplitude value belonging to {2, 3} is configured via RRC signaling.

In one embodiment, only one of the alternatives in TABLES 12-17 is supported in the present disclosure. In another embodiment, the UE is configured with one of the bit allocation alternatives in TABLES 12-17 via higher layer RRC or more dynamic MAC CE based or DCI based signaling. In yet another embodiment, the UE reports a preferred bit allocation as part of the CSI report where this reporting is WB either jointly with at least one of other WB CSI reports or separately as another WB CSI report.

TABLE 12

Bit allocation for L = 2 and max 2 bits/amplitude, common quantization bits across polarization

| Amplitude index i (after sorting) | Number of bits | Bit allocation Alt0 |
|---|---|---|
| 0, 2 | $N_{1,l,0} = N_{1,l,2}$ | 0 |
| 1, 3 | $N_{1,l,1} = N_{1,l,3}$ | 2 |

TABLE 13

Bit allocation for L = 2 and max 3 bits/amplitude, common quantization bits across polarization

| Amplitude index i (after sorting) | Number of bits | Bit allocation Alt0 |
|---|---|---|
| 0, 2 | $N_{1,l,0} = N_{1,l,2}$ | 0 |
| 1, 3 | $N_{1,l,1} = N_{1,l,3}$ | 3 |

TABLE 14

Bit allocation for L = 3 and max 2 bits/amplitude, common quantization bits across polarization

| Amplitude index i (after sorting) | Number of bits | Bit allocation | | |
|---|---|---|---|---|
| | | Alt0 | Alt1 | Alt2 |
| 0, 3 | $N_{1,l,0} = N_{1,l,3}$ | 0 | 0 | 0 |
| 1, 4 | $N_{1,l,1} = N_{1,l,4}$ | 2 | 2 | 2 |
| 2, 5 | $N_{1,l,2} = N_{1,l,5}$ | 2 | 1 | 0 |

TABLE 15

Bit allocation for L = 3 and max 3 bits/amplitude, common quantization bits across polarization

| Amplitude index i (after sorting) | Number of bits | Bit allocation | | | |
|---|---|---|---|---|---|
| | | Alt0 | Alt1 | Alt2 | Alt3 |
| 0, 3 | $N_{1,l,0} = N_{1,l,3}$ | 0 | 0 | 0 | 0 |
| 1, 4 | $N_{1,l,1} = N_{1,l,4}$ | 3 | 3 | 3 | 3 |
| 2, 5 | $N_{1,l,2} = N_{1,l,5}$ | 3 | 2 | 1 | 0 |

TABLE 16

Bit allocation for L = 4 and max 2 bits/amplitude, common quantization bits across polarization

| Amplitude index i (after sorting) | Number of bits | Bit allocation | | | | | |
|---|---|---|---|---|---|---|---|
| | | Alt0 | Alt1 | Alt2 | Alt3 | Alt4 | Alt5 |
| 0, 4 | $N_{1,l,0} = N_{1,l,4}$ | 0 | 0 | 0 | 0 | 0 | 0 |
| 1, 5 | $N_{1,l,1} = N_{1,l,5}$ | 2 | 2 | 2 | 2 | 2 | 2 |
| 2, 6 | $N_{1,l,2} = N_{1,l,6}$ | 2 | 2 | 2 | 1 | 1 | 0 |
| 3, 7 | $N_{1,l,3} = N_{1,l,7}$ | 2 | 1 | 0 | 1 | 0 | 0 |

TABLE 17

Bit allocation for L = 4 and max 3 bits/amplitude, common quantization bits across polarization

| Amplitude index i (after sorting) | Number of bits | Bit allocation | | | | | | | | | |
|---|---|---|---|---|---|---|---|---|---|---|---|
| | | Alt0 | Alt1 | Alt2 | Alt3 | Alt4 | Alt5 | Alt6 | Alt7 | Alt8 | Alt9 |
| 0, 4 | $N_{1,l,0} = N_{1,l,4}$ | 0 | 0 | 0 | 0 | 0 | 0 | 0 | 0 | 0 | 0 |
| 1, 5 | $N_{1,l,1} = N_{1,l,5}$ | 3 | 3 | 3 | 3 | 3 | 3 | 3 | 3 | 3 | 3 |

TABLE 17-continued

Bit allocation for L = 4 and max 3 bits/amplitude, common quantization bits across polarization

| Amplitude index i (after sorting) | Number of bits | Bit allocation | | | | | | | | | |
|---|---|---|---|---|---|---|---|---|---|---|---|
| | | Alt0 | Alt1 | Alt2 | Alt3 | Alt4 | Alt5 | Alt6 | Alt7 | Alt8 | Alt9 |
| 2, 6 | $N_{1,l,2} = N_{1,l,6}$ | 3 | 3 | 3 | 2 | 3 | 2 | 2 | 1 | 1 | 0 |
| 3, 7 | $N_{1,l,3} = N_{1,l,7}$ | 3 | 2 | 1 | 2 | 0 | 1 | 0 | 1 | 0 | 0 |

In some embodiments, for Alt 1-0 or Alt 1-1 of amplitude sorting, the bit allocation is common for each of L beams across two polarizations: for L=2 beams and max 2 bits/amplitude, the bit allocation is according to at least one alternative in TABLE 18; for L=2 beams and max 3 bits/amplitude, the bit allocation is according to at least one alternative in TABLE 19; for L=3 beams and max 2 bits/amplitude, the bit allocation is according to at least one alternative in TABLE 20; for L=3 beams and max 3 bits/amplitude, the bit allocation is according to at least one alternative in TABLE 21; for L=4 beams and max 2 bits/amplitude, the bit allocation is according to at least one alternative in TABLE 22; and for L=4 beams and max 3 bits/amplitude, the bit allocation is according to at least one alternative in TABLE 23.

Note that if the number of bit $N_{1,l,i}=0$, then the amplitude is equal to 1 and if $N_{1,l,i}>0$, then the amplitude codebook is as in the aforementioned embodiment 0. In these alternatives, the strongest beam corresponds to one of the two polarizations (i=0), hence the corresponding amplitude is not reported (assumed to be 1), and the amplitude corresponding to the other polarization (i=L) is reported.

The UE is configured with an L value belonging to {2, 3, 4} and a max number of bits/amplitude value belonging to {2, 3}. This configuration is via higher layer RRC signaling. In another alternative, the UE reports a preferred L value (WB report) and a max number of bits/amplitude value belonging to {2, 3} is configured via RRC signaling.

In one embodiment, only one of the alternatives in TABLES 18-23 is supported in the specification. In another method, the UE is configured with one of the bit allocation alternatives in TABLES 18-23 via higher layer RRC or more dynamic MAC CE based or DCI based signaling. In yet another alternative, the UE reports a preferred bit allocation as part of the CSI report where this reporting is WB either jointly with at least one of other WB CSI reports or separately as another WB CSI report.

TABLE 18

Bit allocation for L = 2 and max 2 bits/amplitude, common quantization bits across polarization

| Amplitude index i (after sorting) | Number of bits | Bit allocation | | |
|---|---|---|---|---|
| | | Alt0 | Alt1 | Alt2 |
| 0 | $N_{1,l,0}$ | 0 | 0 | 0 |
| 2 | $N_{1,l,2}$ | 2 | 2 | 2 |
| 1, 3 | $N_{1,l,1} = N_{1,l,3}$ | 2 | 1 | 0 |

TABLE 19

Bit allocation for L = 2 and max 3 bits/amplitude, common quantization bits across polarization

| Amplitude index i (after sorting) | Number of bits | Bit allocation | | | |
|---|---|---|---|---|---|
| | | Alt0 | Alt1 | Alt2 | Alt3 |
| 0 | $N_{1,l,0}$ | 0 | 0 | 0 | 0 |
| 2 | $N_{1,l,2}$ | 3 | 3 | 3 | 3 |
| 1, 3 | $N_{1,l,1} = N_{1,l,3}$ | 3 | 2 | 1 | 0 |

TABLE 20

Bit allocation for L = 3 and max 2 bits/amplitude, common quantization bits across polarization

| Amplitude index i (after sorting) | Number of bits | Bit allocation | | | | | |
|---|---|---|---|---|---|---|---|
| | | Alt0 | Alt1 | Alt2 | Alt3 | Alt4 | Alt5 |
| 0 | $N_{1,l,0}$ | 0 | 0 | 0 | 0 | 0 | 0 |
| 3 | $N_{1,l,3}$ | 2 | 2 | 2 | 2 | 2 | 2 |
| 1, 4 | $N_{1,l,1} = N_{1,l,4}$ | 2 | 2 | 2 | 1 | 1 | 0 |
| 2, 5 | $N_{1,l,2} = N_{1,l,5}$ | 2 | 1 | 0 | 1 | 0 | 0 |

TABLE 21

Bit allocation for L = 3 and max 3 bits/amplitude, common quantization bits across polarization

| Amplitude index i (after sorting) | Number of bits | Bit allocation | | | | | | | | | |
|---|---|---|---|---|---|---|---|---|---|---|---|
| | | Alt0 | Alt1 | Alt2 | Alt3 | Alt4 | Alt5 | Alt6 | Alt7 | Alt8 | Alt9 |
| 0 | $N_{1,l,0}$ | 0 | 0 | 0 | 0 | 0 | 0 | 0 | 0 | 0 | 0 |
| 3 | $N_{1,l,3}$ | 3 | 3 | 3 | 3 | 3 | 3 | 3 | 3 | 3 | 3 |
| 1, 4 | $N_{1,l,1} = N_{1,l,4}$ | 3 | 3 | 3 | 2 | 3 | 2 | 2 | 1 | 1 | 0 |
| 2, 5 | $N_{1,l,2} = N_{1,l,5}$ | 3 | 2 | 1 | 2 | 0 | 1 | 0 | 1 | 0 | 0 |

TABLE 22

Bit allocation for L = 4 and max 2 bits/amplitude,
common quantization bits across polarization

| Amplitude index i (after sorting) | Number of bits | Bit allocation | | | | | | | | |
|---|---|---|---|---|---|---|---|---|---|---|
| | | Alt0 | Alt1 | Alt2 | Alt3 | Alt4 | Alt5 | Alt6 | Alt7 | Alt8 |
| 0 | $N_{1,l,0}$ | 0 | 0 | 0 | 0 | 0 | 0 | 0 | 0 | 0 |
| 4 | $N_{1,l,4}$ | 2 | 2 | 2 | 2 | 2 | 2 | 2 | 2 | 2 |
| 1, 5 | $N_{1,l,1} = N_{1,l,5}$ | 2 | 2 | 2 | 2 | 2 | 2 | 1 | 1 | 0 |
| 2, 6 | $N_{1,l,2} = N_{1,l,6}$ | 2 | 2 | 2 | 1 | 1 | 0 | 1 | 0 | 0 |
| 3, 7 | $N_{1,l,3} = N_{1,l,7}$ | 2 | 1 | 0 | 1 | 0 | 0 | 0 | 0 | 0 |

TABLE 23

Bit allocation for L = 4 and max 3 bits/amplitude,
common quantization bits across polarization

| Amplitude index i (after sorting) | Number of bits | Bit allocation | | | | | | | |
|---|---|---|---|---|---|---|---|---|---|
| | | Alt0 | Alt1 | Alt2 | Alt3 | Alt4 | Alt5 | Alt6 | Alt7 |
| 0 | $N_{1,1,0}$ | 0 | 0 | 0 | 0 | 0 | 0 | 0 | 0 |
| 4 | $N_{1,1,4}$ | 3 | 3 | 3 | 3 | 3 | 3 | 3 | 3 |
| 1, 5 | $N_{1,1,1} = N_{1,1,5}$ | 3 | 3 | 3 | 3 | 3 | 3 | 3 | 3 |
| 2, 6 | $N_{1,1,2} = N_{1,1,6}$ | 3 | 3 | 3 | 2 | 3 | 2 | 2 | 1 |
| 3, 7 | $N_{1,1,3} = N_{1,1,7}$ | 3 | 2 | 1 | 2 | 0 | 1 | 0 | 1 |

| Amplitude index i (after sorting) | Number of bits | Bit allocation | | | | | | | |
|---|---|---|---|---|---|---|---|---|---|
| | | Alt8 | Alt9 | Alt10 | Alt11 | Alt12 | Alt13 | Alt14 | Alt15 |
| 0 | $N_{1,l,0}$ | 0 | 0 | 0 | 0 | 0 | 0 | 0 | 0 |
| 4 | $N_{1,l,4}$ | 3 | 3 | 3 | 3 | 3 | 3 | 3 | 3 |
| 1, 5 | $N_{1,l,1} = N_{1,l,5}$ | 3 | 2 | 3 | 2 | 2 | 1 | 1 | 0 |
| 2, 6 | $N_{1,l,2} = N_{1,l,6}$ | 1 | 2 | 0 | 1 | 0 | 1 | 0 | 0 |
| 3, 7 | $N_{1,l,3} = N_{1,l,7}$ | 0 | 0 | 0 | 0 | 0 | 0 | 0 | 0 |

In some embodiments 6, for Alt 1-2 or Alt 1-3 of amplitude sorting, the bit allocation is independent for each of L beams and two polarizations: for L=2 beams and max 2 bits/amplitude, the bit allocation is according to at least one alternative in TABLE 24; for L=2 beams and max 3 bits/amplitude, the bit allocation is according to at least one alternative in TABLE 25; for L=3 beams and max 2 bits/amplitude, the bit allocation is according to at least one alternative in TABLE 26; for L=3 beams and max 3 bits/amplitude, the bit allocation is according to at least one alternative in TABLE 27; for L=4 beams and max 2 bits/amplitude, the bit allocation is according to at least one alternative in TABLE 28; and for L=4 beams and max 3 bits/amplitude, the bit allocation is according to at least one alternative in TABLE 29.

Note that if the number of bit $N_{1,l,i}=0$, then the amplitude is equal to 1 and if $N_{1,l,i}>0$, then the amplitude codebook is as in the aforementioned embodiments 0. In these alternatives, the strongest beam corresponds to one of the two polarizations (i=0), hence the corresponding amplitude is not reported (assumed to be 1), and the amplitude corresponding to the other polarization (i=L) is reported. The amplitudes for remaining 2L−2 coefficients are reported independently.

The UE is configured with an L value belonging to {2, 3, 4} and a max number of bits/amplitude value belonging to {2, 3}. This configuration is via higher layer RRC signaling. In another alternative, the UE reports a preferred L value (WB report) and a max number of bits/amplitude value belonging to {2, 3} is configured via RRC signaling.

In one embodiment, only one of the alternatives in TABLES 24-29 is supported in the specification. In another embodiment, the UE is configured with one of the bit allocation alternatives in TABLE 24-29 via higher layer RRC or more dynamic MAC CE based or DCI based signaling. In yet another alternative, the UE reports a preferred bit allocation as part of the CSI report where this reporting is WB either jointly with at least one of other WB CSI reports or separately as another WB CSI report.

TABLE 24

Bit allocation for L = 2 and max 2 bits/amplitude,
independent quantization across polarization

| Amplitude index i (after sorting) | Number of bits | Bit allocation | | | | | |
|---|---|---|---|---|---|---|---|
| | | Alt0 | Alt1 | Alt2 | Alt3 | Alt4 | Alt5 |
| 0 | $N_{1,l,0}$ | 0 | 0 | 0 | 0 | 0 | 0 |
| 1 | $N_{1,l,1}$ | 2 | 2 | 2 | 2 | 2 | 2 |
| 2 | $N_{1,l,2}$ | 2 | 2 | 2 | 1 | 1 | 0 |
| 3 | $N_{1,l,3}$ | 2 | 1 | 0 | 1 | 0 | 0 |

TABLE 25

Bit allocation for L = 2 and max 3 bits/amplitude, independent quantization across polarization

| Amplitude index i (after sorting) | Number of bits | Bit allocation | | | | | | | | | |
|---|---|---|---|---|---|---|---|---|---|---|---|
| | | Alt0 | Alt1 | Alt2 | Alt3 | Alt4 | Alt5 | Alt6 | Alt7 | Alt8 | Alt9 |
| 0 | $N_{1,l,0}$ | 0 | 0 | 0 | 0 | 0 | 0 | 0 | 0 | 0 | 0 |
| 1 | $N_{1,l,1}$ | 3 | 3 | 3 | 3 | 3 | 3 | 3 | 3 | 3 | 3 |
| 2 | $N_{1,l,2}$ | 3 | 3 | 3 | 2 | 3 | 2 | 2 | 1 | 1 | 0 |
| 3 | $N_{1,l,3}$ | 3 | 2 | 1 | 2 | 0 | 1 | 0 | 1 | 0 | 0 |

TABLE 26

Bit allocation for L = 3 and max 2 bits/amplitude, independent quantization across polarization

| Amplitude index i (after sorting) | Number of bits | Bit allocation | | | | | | | | | | | |
|---|---|---|---|---|---|---|---|---|---|---|---|---|---|
| | | Alt0 | Alt1 | Alt2 | Alt3 | Alt4 | Alt5 | Alt6 | Alt7 | Alt8 | Alt9 | Alt10 | Alt11 |
| 0 | $N_{1,l,0}$ | 0 | 0 | 0 | 0 | 0 | 0 | 0 | 0 | 0 | 0 | 0 | 0 |
| 1 | $N_{1,l,1}$ | 2 | 2 | 2 | 2 | 2 | 2 | 2 | 2 | 2 | 2 | 2 | 2 |
| 2 | $N_{1,l,2}$ | 2 | 2 | 2 | 2 | 2 | 2 | 2 | 2 | 2 | 1 | 1 | 0 |
| 3 | $N_{1,l,3}$ | 2 | 2 | 2 | 2 | 2 | 2 | 1 | 1 | 0 | 1 | 0 | 0 |
| 4 | $N_{1,l,4}$ | 2 | 2 | 2 | 1 | 1 | 0 | 1 | 0 | 0 | 0 | 0 | 0 |
| 5 | $N_{1,l,5}$ | 2 | 1 | 0 | 1 | 0 | 0 | 0 | 0 | 0 | 0 | 0 | 0 |

TABLE 27

Bit allocation for L = 3 and max 3 bits/amplitude, independent quantization across polarization

| Amplitude index i (after sorting) | Number of bits | Bit allocation | | | | | | | | | | |
|---|---|---|---|---|---|---|---|---|---|---|---|---|
| | | Alt0 | Alt1 | Alt2 | Alt3 | Alt4 | Alt5 | Alt6 | Alt7 | Alt8 | Alt9 | Alt10 |
| 0 | $N_{1,l,0}$ | 0 | 0 | 0 | 0 | 0 | 0 | 0 | 0 | 0 | 0 | 0 |
| 1 | $N_{1,l,1}$ | 3 | 3 | 3 | 3 | 3 | 3 | 3 | 3 | 3 | 3 | 3 |
| 2 | $N_{1,l,2}$ | 3 | 3 | 3 | 3 | 3 | 3 | 3 | 3 | 3 | 3 | 3 |
| 3 | $N_{1,l,3}$ | 3 | 3 | 3 | 3 | 3 | 3 | 3 | 3 | 3 | 2 | 3 |
| 4 | $N_{1,l,4}$ | 3 | 3 | 3 | 2 | 3 | 2 | 2 | 1 | 1 | 2 | 0 |
| 5 | $N_{1,l,5}$ | 3 | 2 | 1 | 2 | 0 | 1 | 0 | 1 | 0 | 0 | 0 |

| Amplitude index i (after sorting) | Number of bits | Bit allocation | | | | | | | | | | |
|---|---|---|---|---|---|---|---|---|---|---|---|---|
| | | Alt11 | Alt12 | Alt13 | Alt14 | Alt15 | Alt16 | Alt17 | Alt18 | Alt19 | Alt20 | Alt21 |
| 0 | $N_{1,l,0}$ | 0 | 0 | 0 | 0 | 0 | 0 | 0 | 0 | 0 | 0 | 0 |
| 1 | $N_{1,l,1}$ | 3 | 3 | 3 | 3 | 3 | 3 | 3 | 3 | 3 | 3 | 3 |
| 2 | $N_{1,l,2}$ | 3 | 3 | 3 | 3 | 2 | 3 | 2 | 2 | 1 | 1 | 0 |
| 3 | $N_{1,l,3}$ | 2 | 2 | 1 | 1 | 2 | 0 | 1 | 0 | 1 | 0 | 0 |
| 4 | $N_{1,l,4}$ | 1 | 0 | 1 | 0 | 0 | 0 | 0 | 0 | 0 | 0 | 0 |
| 5 | $N_{1,l,5}$ | 0 | 0 | 0 | 0 | 0 | 0 | 0 | 0 | 0 | 0 | 0 |

TABLE 28

Bit allocation for L = 4 and max 2 bits/amplitude, independent quantization across polarization

| Amplitude index i (after sorting) | Bit allocation (number of bits) | | | | | | | | |
|---|---|---|---|---|---|---|---|---|---|
| | Alt0 | Alt1 | Alt2 | Alt3 | Alt4 | Alt5 | Alt6 | Alt7 | Alt8 |
| 0 | 0 | 0 | 0 | 0 | 0 | 0 | 0 | 0 | 0 |
| 1 | 2 | 2 | 2 | 2 | 2 | 2 | 2 | 2 | 2 |
| 2 | 2 | 2 | 2 | 2 | 2 | 2 | 2 | 2 | 2 |
| 3 | 2 | 2 | 2 | 2 | 2 | 2 | 2 | 2 | 2 |
| 4 | 2 | 2 | 2 | 2 | 2 | 2 | 2 | 2 | 2 |
| 5 | 2 | 2 | 2 | 2 | 2 | 2 | 1 | 1 | 0 |
| 6 | 2 | 2 | 2 | 1 | 1 | 0 | 1 | 0 | 0 |
| 7 | 2 | 1 | 0 | 1 | 0 | 0 | 0 | 0 | 0 |

TABLE 28-continued

| Amplitude index i (after sorting) | Bit allocation (number of bits) | | | | | | | | |
|---|---|---|---|---|---|---|---|---|---|
| | Alt9 | Alt10 | Alt11 | Alt12 | Alt13 | Alt14 | Alt15 | Alt16 | Alt17 |
| 0 | 0 | 0 | 0 | 0 | 0 | 0 | 0 | 0 | 0 |
| 1 | 2 | 2 | 2 | 2 | 2 | 2 | 2 | 2 | 2 |
| 2 | 2 | 2 | 2 | 2 | 2 | 2 | 1 | 1 | 0 |
| 3 | 2 | 2 | 2 | 1 | 1 | 0 | 1 | 0 | 0 |
| 4 | 1 | 1 | 0 | 1 | 0 | 0 | 0 | 0 | 0 |
| 5 | 1 | 0 | 0 | 0 | 0 | 0 | 0 | 0 | 0 |
| 6 | 0 | 0 | 0 | 0 | 0 | 0 | 0 | 0 | 0 |
| 7 | 0 | 0 | 0 | 0 | 0 | 0 | 0 | 0 | 0 |

TABLE 29

Bit allocation for L = 4 and max 3 bits/amplitude, independent quantization across polarization

| Amplitude index i (after sorting) | Bit allocation (number of bits) | | | | | | | | | | | |
|---|---|---|---|---|---|---|---|---|---|---|---|---|
| | Alt0 | Alt1 | Alt2 | Alt3 | Alt4 | Alt5 | Alt6 | Alt7 | Alt8 | Alt9 | Alt10 | Alt11 |
| 0 | 0 | 0 | 0 | 0 | 0 | 0 | 0 | 0 | 0 | 0 | 0 | 0 |
| 1 | 3 | 3 | 3 | 3 | 3 | 3 | 3 | 3 | 3 | 3 | 3 | 3 |
| 2 | 3 | 3 | 3 | 3 | 3 | 3 | 3 | 3 | 3 | 3 | 3 | 3 |
| 3 | 3 | 3 | 3 | 3 | 3 | 3 | 3 | 3 | 3 | 3 | 3 | 3 |
| 4 | 3 | 3 | 3 | 3 | 3 | 3 | 3 | 3 | 3 | 3 | 3 | 3 |
| 5 | 3 | 3 | 3 | 3 | 3 | 3 | 3 | 3 | 3 | 2 | 3 | 2 |
| 6 | 3 | 3 | 3 | 2 | 3 | 2 | 2 | 1 | 1 | 2 | 0 | 1 |
| 7 | 3 | 2 | 1 | 2 | 0 | 1 | 0 | 1 | 0 | 0 | 0 | 0 |

| Amplitude index i (after sorting) | Bit allocation (number of bits) | | | | | | | | | | | |
|---|---|---|---|---|---|---|---|---|---|---|---|---|
| | Alt12 | Alt13 | Alt14 | Alt15 | Alt16 | Alt17 | Alt18 | Alt19 | Alt20 | Alt21 | Alt22 | Alt23 |
| 0 | 0 | 0 | 0 | 0 | 0 | 0 | 0 | 0 | 0 | 0 | 0 | 0 |
| 1 | 3 | 3 | 3 | 3 | 3 | 3 | 3 | 3 | 3 | 3 | 3 | 3 |
| 2 | 3 | 3 | 3 | 3 | 3 | 3 | 3 | 3 | 3 | 3 | 3 | 3 |
| 3 | 3 | 3 | 3 | 3 | 3 | 3 | 3 | 3 | 3 | 2 | 3 | 2 |
| 4 | 3 | 3 | 3 | 2 | 3 | 2 | 2 | 1 | 1 | 2 | 0 | 1 |
| 5 | 2 | 1 | 1 | 2 | 0 | 1 | 0 | 1 | 0 | 0 | 0 | 0 |
| 6 | 0 | 1 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 |

| Amplitude index i (after sorting) | Bit allocation (number of bits) | | | | | | | | | |
|---|---|---|---|---|---|---|---|---|---|---|
| | Alt24 | Alt25 | Alt25 | Alt26 | Alt27 | Alt28 | Alt29 | Alt30 | Alt31 | Alt32 |
| 0 | 0 | 0 | 0 | 0 | 0 | 0 | 0 | 0 | 0 | 0 |
| 1 | 3 | 3 | 3 | 3 | 3 | 3 | 3 | 3 | 3 | 3 |
| 2 | 3 | 3 | 3 | 2 | 3 | 2 | 2 | 1 | 1 | 0 |
| 3 | 2 | 1 | 1 | 2 | 0 | 1 | 0 | 1 | 0 | 0 |
| 4 | 0 | 1 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |

In some embodiments 7, the bit-allocation for phase is according to at least one of the following. In one example of Alt 7-0, the bit-allocation for phase is the same as that for amplitude and is according to at least one of the bit allocation alternatives in the aforementioned embodiments 4-6. In another example of Alt 7-1, the bit-allocation for phase is different from that for amplitude and is according to at least one of the bit allocation alternatives in the aforementioned embodiments 4-6. In yet another example of Alt 7-2, the bit allocation of phase is fixed, for example to equal bit allocation to 2 or 3 bits.

In some embodiments 8, a UE is configured (via RRC signaling) with an L value belonging to {2, 3, 4}, a max number of bits/amplitude value belonging to {2, 3}, and the total of amplitude quantization bits $\Sigma_{i=0}^{2L-1} N_{1,l,i}$ or/and $\Sigma_{i=0}^{2L-1} N_{2,l,i}$. The UE reports the quantized amplitudes according to one of the bit allocation alternatives in the aforementioned embodiments 4-6. If there are more than one bit allocation alternatives that satisfy the configured value of the total of amplitude quantization bits, then the UE reports a preferred bit allocation out of all such bit allocation alternatives where this reporting is WB either jointly with other WB CSI reports or separately as another WB CSI report.

In some embodiments 9, a UE is configured with bit allocation for amplitude or/and phase reporting according to at least one of the following alternatives. In one instance of Alt 9-0, the bit allocation is equal for all L. In one instance of Alt 9-1, the bit allocation is unequal for all L values. In one instance of Alt 9-2, the bit allocation is equal or unequal for all L values depending on configuration. In one instance of Alt 9-3, the bit allocation is equal for L≤M and is unequal for L>M. An example value for M is 2. Another example value for M is 3.

Figure 13:
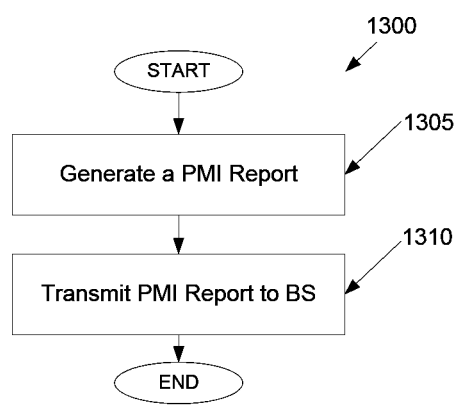
FIG. 13 illustrates a flowchart of a method for PMI reporting according to embodiments of the present disclosure.

FIG. 13 illustrates a flowchart of a method 1300 for PMI reporting according to embodiments of the present disclosure. The method 1300 may be performed by a UE, for example, UE 116, according to embodiments of the present disclosure. The embodiment of the method 1300 illustrated in FIG. 13 is for illustration only. FIG. 13 does not limit the scope of this disclosure to any particular implementation.

The method 1300 begins with the UE generating a report for a PMI (step 1305). In step 1305, the report includes, at least, (i) a wideband amplitude coefficient indicator that is common for a plurality of subbands configured for reporting and (ii) a subband amplitude coefficient indicator and a subband phase coefficient indicator for each of the subbands. In some embodiments, the report includes 2*L number of beam coefficients for each of the subbands and for each of a plurality of υ layers where L is a number of beams configured for reporting and υ is a RI value associated with the reported PMI. Each of one or more of the beam coefficients includes (i) the wideband amplitude coefficient indicator that is common for the subbands and (ii) the subband amplitude coefficient indicator and the subband phase coefficient indicator for each of the subbands. Additionally, at least one of the beam coefficients is reported using a number of bits that is unequal to number of bits used to report another of the beam coefficients.

In various embodiments, the UE includes in the report, for each of the υ layers, a strongest of the 2*L number of beam coefficients that is common for the subbands and groups the remaining 2*L−1 number of beam coefficients into two groups. In these embodiments, a fewer number of bits are used to report the beam coefficients in a second of the two groups; hence, an unequal number of bits to report the two groups. In at least some of these embodiments, a first of the two groups includes min(M,K)−1 beam coefficients that are strongest coefficients of the remaining 2*L−1 number of beam coefficients and the second group includes 2L−min (M,K) beam coefficients where M is a number of beam coefficients whose wideband amplitude coefficient indicators indicate non-zero wideband amplitude values and K is a positive integer. In these embodiments, the report does not include subband amplitude coefficient indicators for the second group of beam coefficients. In some embodiments, the strongest coefficients used to group the remaining 2*L−1 beam coefficients into the two groups are determined based on the wideband amplitude coefficient indicator for each of the beam coefficients.

In various embodiments, for each beam coefficient in the first group, 3 bits are used to report the wideband amplitude coefficient indicator; 1 bit is used to report the subband amplitude coefficient indicator; and 2 or 3 bits are configured to report the subband phase coefficient indicator. For the second group, for each beam coefficient, 3 bits are used to report the wideband amplitude coefficient indicator; for each beam coefficient in the M−min(M,K) beam coefficients whose wideband amplitude coefficient indicators indicate non-zero wideband amplitude values, 2 bits are used to report the subband phase coefficient indicator; and for the remaining 2L−M beam coefficients whose wideband amplitude coefficient indicators indicate a zero wideband amplitude value, subband phase coefficient indicators are not reported.

Thereafter, the UE transmits the generated report for the PMI to a BS (step 1310). In step 1310, the UE reports the PMI to the BS, for example, BS 102.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A terminal for transmitting a signal in a wireless communication system, the terminal comprising:
a transceiver configured to transmit and receive a signal; and
a controller coupled with the transceiver and configured to:
receive, from a base station, a message including information configuring a codebook for a precoding matrix indicator (PMI),
generate channel state information (CSI) including the PMI based on the information, and
transmit, to the base station, the CSI including the PMI,
wherein a bit size for a subband amplitude associated with the PMI is 0, in case that the information configures that a subband amplitude is not reported, and
wherein the bit size for the subband amplitude associated with the PMI is related to a value (K) identified based on a number of beams (L), in case that the information configures that the subband amplitude is reported.

2. The terminal of claim 1, wherein the value (K) is identified as 4 in case that the number of beams (L) is 2 or 3, and the value (K) is identified as 6 in case that the number of beams (L) is 4.

3. The terminal of claim 1, wherein a bit size for a wideband amplitude associated with the PMI is related to a number of 2L−1 coefficients, where L is the number of beams, and
wherein a bit size for a subband phase associated with the PMI is independently identified for each case of the information configures that the subband amplitude is not reported and the information configures that the subband amplitude is reported.

4. The terminal of claim 3, wherein in case of the information configures that the subband amplitude is reported, 2L−1 coefficients are partitioned into group 1 comprising a first number of coefficients, and group 2 comprising a second number of coefficients, wherein
the first number of coefficients and the second number of coefficients are related to the value (K) identified based on the number of beams (L), and
coefficients in group 1 and coefficients in group 2 are determined based on the wideband amplitude for each of the 2L−1 coefficients such that group 1 includes strongest of the 2L−1 coefficients having larger wideband amplitude values.

5. The terminal of claim 4, wherein a number of bits for a subband phase corresponding to each of the first number of coefficients is 2 or 3, and the number of bits for the subband phase corresponding to each of a second number of coefficients is 2, in case that the information configures that the subband amplitude is reported.

6. The terminal of claim 4, wherein in case of the information configures that the subband amplitude is reported, the subband amplitude is reported for each coefficient in group 1, and
wherein a subband amplitude corresponding to coefficients in group 2 is not reported.

7. The terminal of claim 3, wherein a number of bits for the wideband amplitude corresponding to each of the coefficients is 3,
wherein a number of bits for the subband amplitude corresponding to each of the coefficients in group 1 is 1, and
wherein a number of bits for the subband amplitude corresponding to each of the coefficients in group 2 is 0.

8. A base station for receiving a signal in a wireless communication system, the base station comprising:
a transceiver configured to transmit and receive a signal; and
a controller coupled with the transceiver and configured to:
transmit, to a terminal, a message including information configuring a codebook for a precoding matrix indicator (PMI), and
receive, from the terminal, channel state information (CSI) including the PMI and generated based on the information,
wherein a bit size for a subband amplitude associated with the PMI is 0, in case that the information configures that a subband amplitude is not reported, and
wherein the bit size for the subband amplitude associated with the PMI is related to a value (K) identified based on a number of beams (L), in case that the information configures that the subband amplitude is reported.

9. The base station of claim 8, wherein the value (K) is identified as 4 in case that the number of beams (L) is 2 or 3, and the value (K) is identified as 6 in case that the number of beams (L) is 4.

10. The base station of claim 8, wherein a bit size for a wideband amplitude associated with the PMI is related to a number of 2L−1 coefficients, where L is the number of beams, and
wherein a bit size for a subband phase associated with the PMI is independently identified for each case of the information configures that the subband amplitude is not reported and the information configures that the subband amplitude is reported.

11. The base station of claim 10, wherein, in case of the information configures that the subband amplitude is reported, 2L−1 coefficients are partitioned into group 1 comprising a first number of coefficients, and group 2 comprising a second number of coefficients, wherein
the first number of coefficients and the second number of coefficients are related to the value (K) identified based on the number of beams (L), and
coefficients in group 1 and coefficients in group 2 are determined based on the wideband amplitude for each of the 2L−1 coefficients such that group 1 includes strongest of the 2L−1 coefficients having larger wideband amplitude values.

12. The base station of claim 11, wherein a number of bits for a subband phase corresponding to each of the first number of coefficients is 2 or 3, and the number of bits for the subband phase corresponding to each of a second number of coefficients is 2, in case that the information configures that the subband amplitude is reported.

13. The base station of claim 11, wherein in case of the information configures that the subband amplitude is reported, the subband amplitude is reported for each coefficient in group 1, and
wherein a subband amplitude corresponding to coefficients in group 2 is not reported.

14. The base station of claim 10, wherein a number of bits for the wideband amplitude corresponding to each of plurality of coefficients is 3,
wherein a number of bits for the subband amplitude corresponding to each of the coefficients in group 1 is 1, and
wherein a number of bits for the subband amplitude corresponding to each of the coefficients in group 2 is 0.

15. A method of transmitting a signal by a terminal in a wireless communication system, the method comprising:
receiving, from a base station, a message including information configuring a codebook for a precoding matrix indicator (PMI);
generating channel state information (CSI) including the PMI based on the information; and
transmitting, to the base station, the CSI including the PMI,
wherein a bit size for a subband amplitude associated with the PMI is 0, in case that the information configures that a subband amplitude is not reported, and
wherein the bit size for the subband amplitude associated with the PMI is related to a value (K) identified based on a number of beams (L), in case that the information configures that the subband amplitude is reported.

16. The method of claim 15, wherein the value (K) is identified as 4 in case that the number of beams (L) is 2 or 3, and the value (K) is identified as 6 in case that the number of beams (L) is 4.

17. The method of claim 15, wherein a bit size for a wideband amplitude associated with the PMI is related to a number of 2L−1 coefficients, where L is the number of beams, and
wherein a bit size for a subband phase associated with the PMI is independently identified for each case of the information configures that the subband amplitude is not reported and the information configures that the subband amplitude is reported.

18. The method of claim 17, wherein in case of the information configures that the subband amplitude is reported, 2L−1 coefficients are partitioned into group 1 comprising a first number of coefficients, and group 2 comprising a second number of coefficients, wherein
the first number of coefficients and the second number of coefficients are related to the value (K) identified based on the number of beams (L), and
coefficients in group 1 and coefficients in group 2 are determined based on the wideband amplitude for each of the 2L−1 coefficients such that group 1 includes strongest of the 2L−1 coefficients having larger wideband amplitude values.

19. The method of claim 18, wherein a number of bits for a subband phase corresponding to each of the first number of coefficients is 2 or 3, and the number of bits for the subband phase corresponding to each of a second number of coefficients is 2, in case that the information configures that the subband amplitude is reported.

20. The method of claim 18, wherein in case of the information configures that the subband amplitude is reported, the subband amplitude is reported for each coefficient in group 1, and wherein a subband amplitude corresponding to coefficients in group 2 is not reported.

\* \* \* \* \*